United States Patent
Harada et al.

(10) Patent No.: US 10,256,465 B2
(45) Date of Patent: Apr. 9, 2019

(54) ACTIVE MATERIAL, ELECTRODE, SECONDARY BATTERY, BATTERY PACK, AND VEHICLE

(71) Applicant: KABUSHIKI KAISHA TOSHIBA, Minato-ku (JP)

(72) Inventors: Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 16 days.

(21) Appl. No.: 15/692,129

(22) Filed: Aug. 31, 2017

(65) Prior Publication Data

US 2018/0277841 A1    Sep. 27, 2018

(30) Foreign Application Priority Data

Mar. 22, 2017  (JP) ................................ 2017-056672

(51) Int. Cl.
*H01M 4/00* (2006.01)
*H01M 4/485* (2010.01)
(Continued)

(52) U.S. Cl.
CPC .......... *H01M 4/485* (2013.01); *C01G 23/005* (2013.01); *C01G 23/006* (2013.01); *C01G 31/006* (2013.01); *C01G 33/006* (2013.01); *C01G 39/006* (2013.01); *C01G 49/0027* (2013.01); *C01G 51/42* (2013.01); *H01M 4/131* (2013.01); *H01M 4/366* (2013.01); *H01M 4/505* (2013.01); *H01M 4/525* (2013.01);
(Continued)

(58) Field of Classification Search
CPC ...... H01M 4/485; H01M 4/131; H01M 4/366; H01M 4/505; H01M 4/525; H01M 4/625; H01M 2/1077; H01M 10/0525; H01M 2004/027
See application file for complete search history.

(56) References Cited

U.S. PATENT DOCUMENTS

2008/0031798 A1   2/2008  Bourbon et al.
2012/0129016 A1   5/2012  Inagaki et al.
(Continued)

FOREIGN PATENT DOCUMENTS

EP    3 141 527 A1    3/2017
EP    3 142 175 A1    3/2017
(Continued)

OTHER PUBLICATIONS

Qinghua Tian, et al., "The lithium storage properties of potassium octatitanate as anode materials for lithium-ion batteries", Materials Letters, vol. 190, Mar. 2017, pp. 4.
(Continued)

*Primary Examiner* — Jane J Rhee
(74) *Attorney, Agent, or Firm* — Oblon, McClelland, Maier & Neustadt LLP

(57) ABSTRACT

According to one embodiment, an active material including a composite oxide is provided. The composite oxide has a monoclinic crystal structure and is represented by the general formula $Li_wM1_{2-x}Ti_{8-y}M2_zO_{17+\delta}$, wherein: M1 is at least one selected from the group consisting of Cs, K, and Na; M2 is at least one selected from the group consisting of Zr, Sn, V, Nb, Ta, Mo, W, Fe, Co, Mn, and Al; $0 \leq w \leq 10$; $0 < x < 2$; $0 < y < 8$; $0 < z < 8$; and $-0.5 \leq \delta \leq 0.5$.

15 Claims, 8 Drawing Sheets

(51) Int. Cl.
*C01G 23/00* (2006.01)
*C01G 31/00* (2006.01)
*C01G 33/00* (2006.01)
*C01G 39/00* (2006.01)
*C01G 49/00* (2006.01)
*C01G 51/00* (2006.01)
*H01M 4/36* (2006.01)
*H01M 4/131* (2010.01)
*H01M 4/505* (2010.01)
*H01M 4/525* (2010.01)
*H01M 10/0525* (2010.01)
*H01M 4/02* (2006.01)
*H01M 4/62* (2006.01)
*H01M 2/10* (2006.01)

(52) U.S. Cl.
CPC ...... *C01P 2002/72* (2013.01); *C01P 2002/76* (2013.01); *C01P 2002/77* (2013.01); *C01P 2006/12* (2013.01); *C01P 2006/40* (2013.01); *H01M 2/1077* (2013.01); *H01M 4/625* (2013.01); *H01M 10/0525* (2013.01); *H01M 2004/027* (2013.01)

(56) References Cited

U.S. PATENT DOCUMENTS

| | | |
|---|---|---|
| 2012/0251887 A1 | 10/2012 | Han |
| 2016/0087273 A1 | 3/2016 | Nakayama |
| 2016/0190574 A1 | 6/2016 | Nagai et al. |
| 2016/0268603 A1 | 9/2016 | Harada et al. |
| 2017/0077507 A1 | 3/2017 | Harada et al. |

FOREIGN PATENT DOCUMENTS

| | | |
|---|---|---|
| JP | 2001-52701 | 2/2001 |
| JP | 2008-511528 | 4/2008 |
| JP | 2010-232029 | 10/2010 |
| JP | 2016-66592 | 4/2016 |
| JP | 2016-171071 | 9/2016 |
| WO | WO 2010/137154 A1 | 12/2010 |
| WO | WO2015/025795 | 2/2015 |

OTHER PUBLICATIONS

Izumi Nakai et al. "Funmatsu X sen Kaisetsu no Jissai (Reality of Powder X-Ray Analysis, X-Ray Analysis Investigation Conversazione)," The Japan Society for Analytical Chemistry, 2002, pp. 7 (with English Translation).

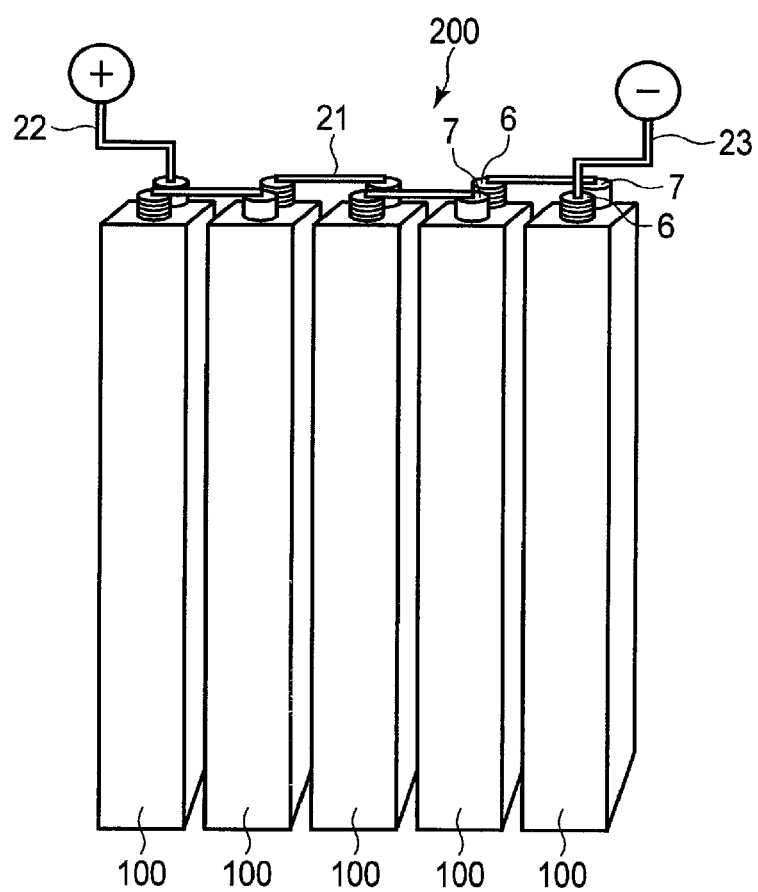
F I G. 6

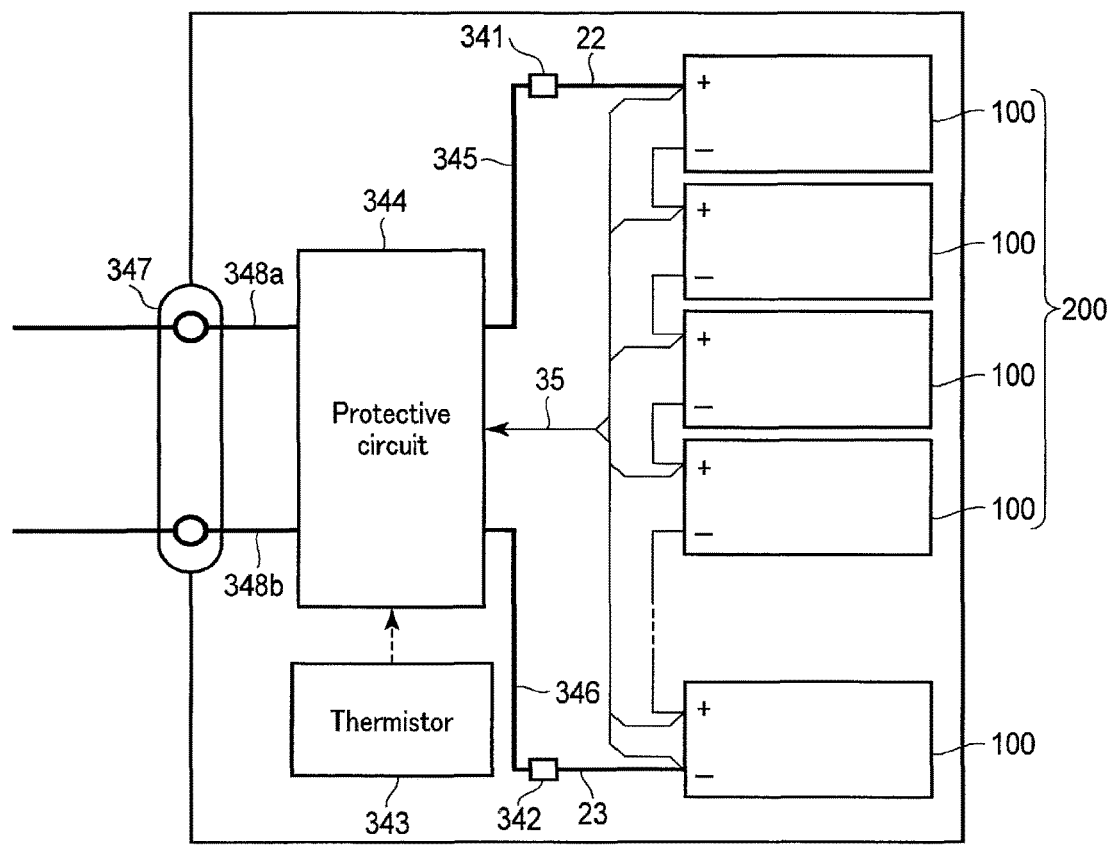
F I G. 8
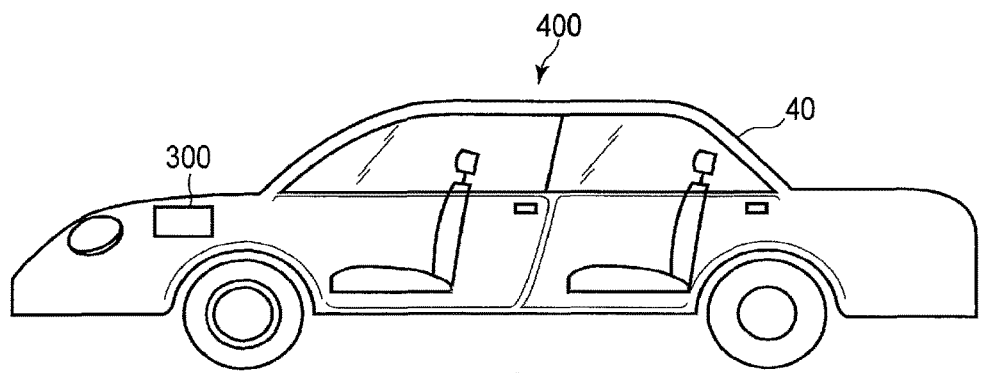
F I G. 9

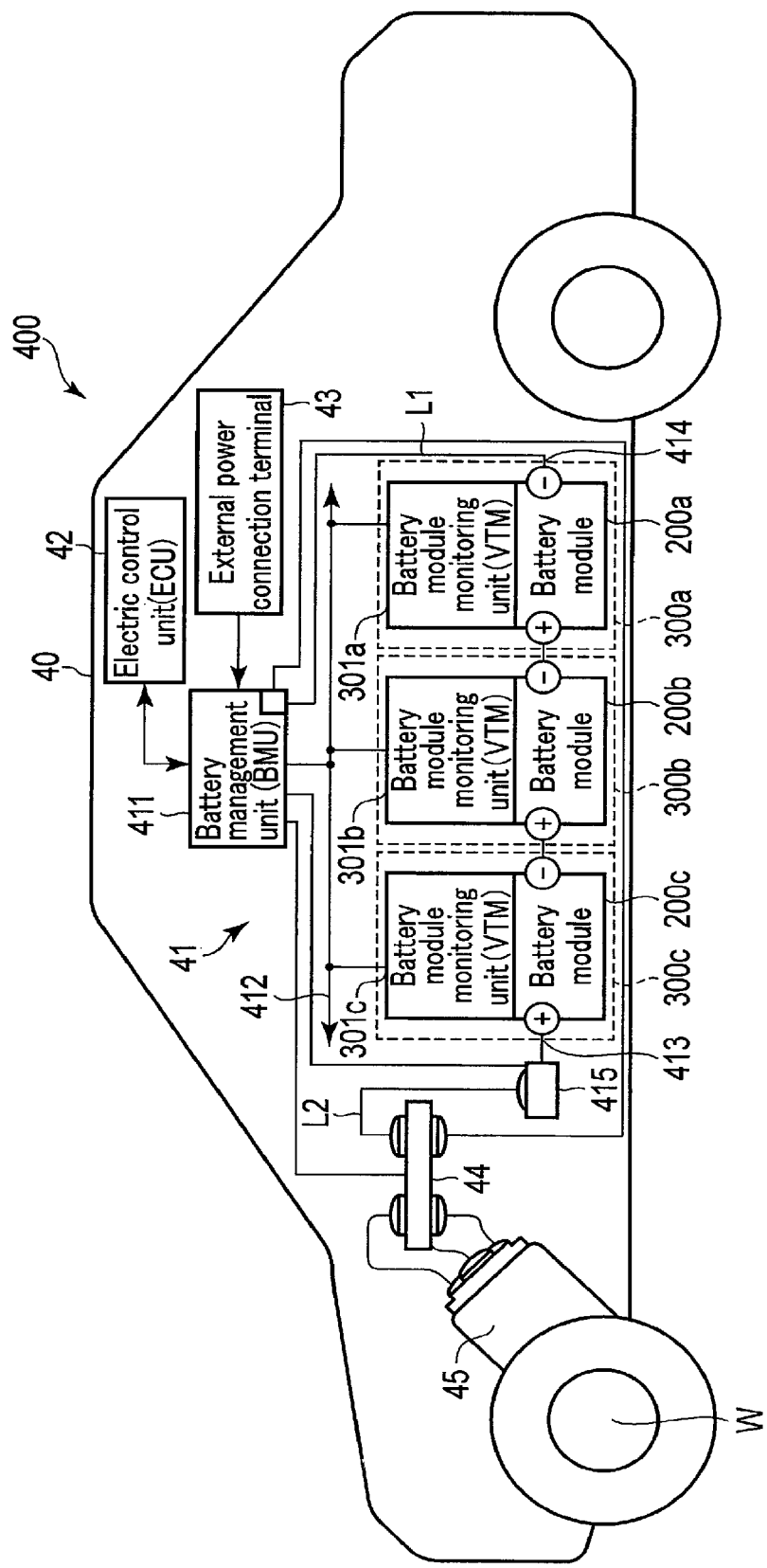
F I G. 10

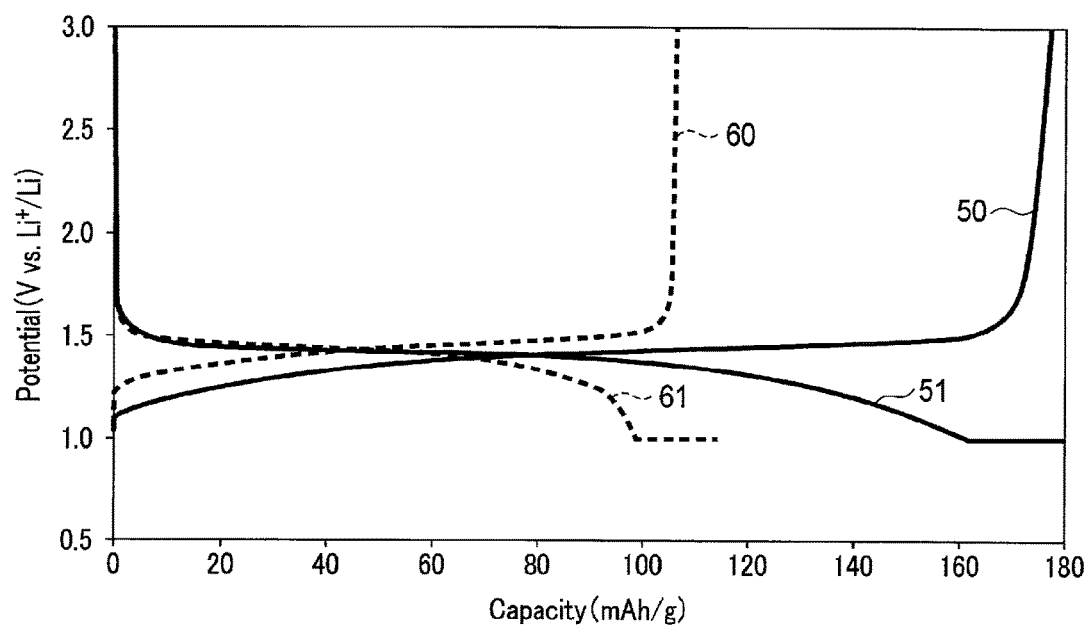
F I G. 11
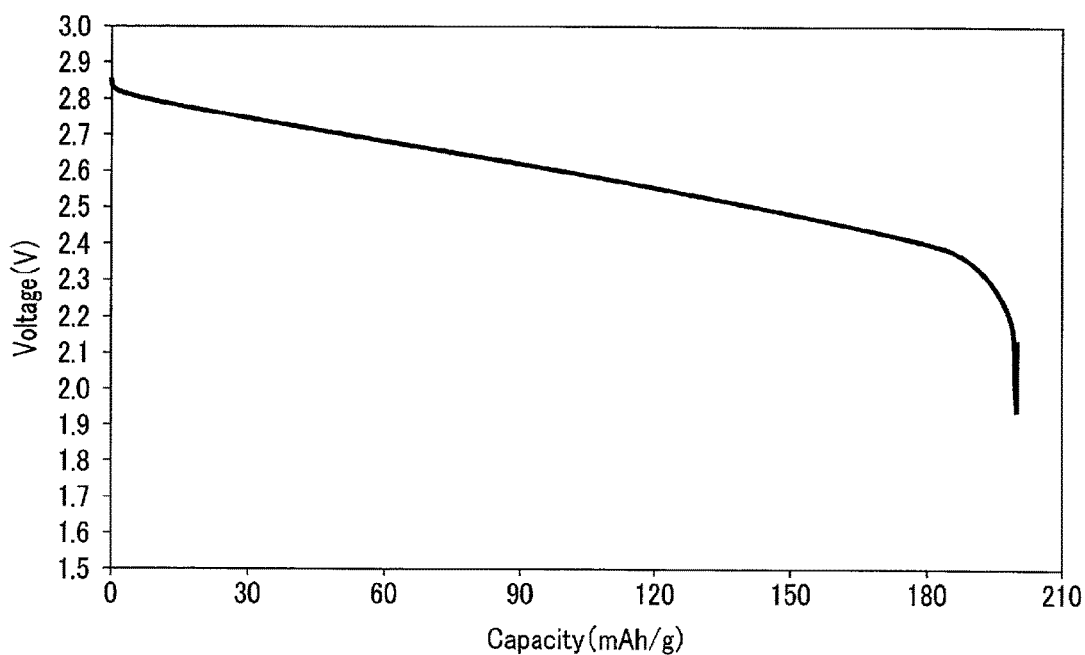
F I G. 12

ACTIVE MATERIAL, ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2017-056672, filed Mar. 22, 2017; the entire contents of which is incorporated herein by reference.

FIELD

Embodiments relate to an active material, an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid automobiles, and efficient recovery of regenerative energy of motive force.

In order to enable rapid charge-and-discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low. In particular, when a material having a high potential relative to metallic lithium is used as a negative electrode material, the voltage is lower than that of a conventional battery using a carbonaceous material. Therefore, when such a material is used for systems requiring a high voltage such as an electric vehicle and a large-scale electric power storage system, there is a problem that the number of batteries connected in series becomes large.

The potential of the electrode using an oxide of titanium is about 1.5 V (vs. Li/Li$^+$) relative to metallic lithium. The potential of an oxide of titanium is attributed to the redox reaction between Ti$^{3+}$ and Ti$^{4+}$ upon electrochemical insertion and extraction of lithium, and is therefore electrochemically restricted. Conventionally, it has therefore been difficult to drop the potential of the electrode in order to improve the energy density.

BRIEF DESCRIPTION OF THE DRAWINGS

FIG. 6 is a perspective view schematically showing an example of a battery module according to an embodiment;

FIG. 8 is a block diagram showing an example of an electric circuit of the battery pack shown in FIG. 7;

FIG. 9 is a cross-sectional view schematically showing an example of a vehicle according to an embodiment;

FIG. 10 is a diagram schematically showing another example of the vehicle according to the embodiment;

FIG. 11 is a graph showing charge and discharge curves obtained in an electrochemical measurement of products of Example 3 and Comparative Example 2; and FIG. 12 is a graph showing a discharge curve of the nonaqueous electrolyte battery of Example 25.

DETAILED DESCRIPTION

Figure 1:
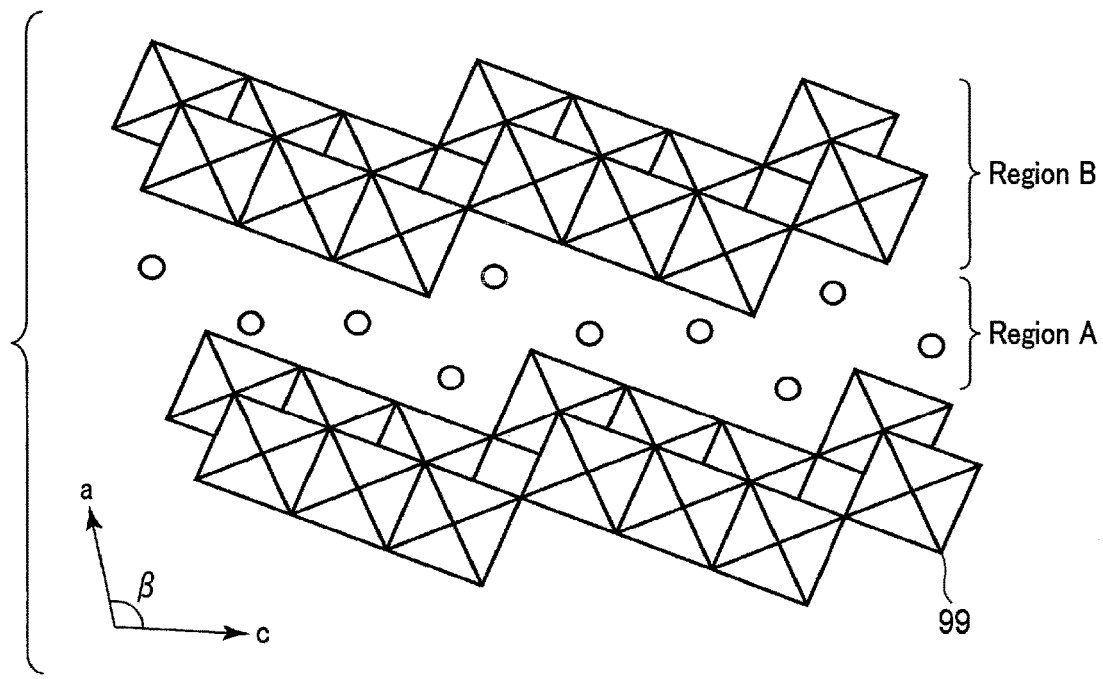
FIG. 1 is a crystal structure diagram of a composite oxide $K_{1.75}Ti_{7.5}Nb_{0.25}O_{17}$.

According to one embodiment, an active material including a composite oxide is provided. The composite oxide has a monoclinic crystal structure and is represented by the general formula $Li_wM1_{2-x}Ti_{8-y}M2O_{17+\delta}$, wherein: M1 is at least one selected from the group consisting of Cs, K, and Na; M2 is at least one selected from the group consisting of Zr, Sn, V, Nb, Ta, Mo, W, Fe, Co, Mn, and Al; $0 \leq w \leq 10$; $0 < x < 2$; $0 < y < 8$; $0 < z < 8$; and $-0.5 \leq \delta \leq 0.5$.

According to another embodiment, an electrode including the active material of the above embodiment is provided.

According to still another embodiment, a secondary battery including a positive electrode, a negative electrode, and an electrolyte is provided. The negative electrode is the electrode according to the above embodiment.

According to yet another embodiment, a battery module including plural secondary batteries is provided. The secondary batteries include the secondary battery according to the above embodiment. The secondary batteries are electrically connected in series, in parallel, or in a combination of in series and in parallel.

According to still another embodiment, a battery pack including secondary batteries is provided. The secondary batteries of the battery pack include the secondary battery according to the above embodiment.

According to yet another embodiment, a vehicle including the battery pack according to the above embodiment is provided.

Where a lithium titanate was adopted as a battery active material, improving energy density has been difficult. In view of this, the inventors of the present application have developed battery active materials including a composite oxide represented by the general formula $Li_{2+a}Na_{2-b}M(I)_cTi_{6-d}M(II)_dO_{14+\delta}$, wherein: M(I) is at least one selected from the group consisting of Cs and K; M(II) is at least one selected from the group consisting of Zr, Sn, V, Nb, Ta, Mo, W, Fe, Co, Mn, and Al; $0 \leq a \leq 4$; $0 < b < 2$; $0 \leq c < 2$; $0 < d \leq 6$; and $-0.5 \leq \delta \leq 0.5$.

This compound has a potential range of 0.5 V (vs. Li/Li$^+$) or higher and 1.45 V (vs. Li/L$^+$) or lower relative to the redox potential of metallic lithium, and therefore allows for a high voltage as compared to the conventional batteries with a negative electrode based on oxides of titanium. On the other hand, the electrode capacity is smaller than the conventional negative electrodes based on oxides of titanium, so a significant improvement of energy density has remained difficult.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be appropriately changed taking the following explanations and known technologies into consideration.

First Embodiment

According to the first embodiment, an active material including a composite oxide of a monoclinic crystal structure is provided. The composite oxide is represented by the general formula $Li_wM1_{2-x}Ti_{8-y}M2_zO_{17+\delta}$, wherein: M1 is at least one selected from the group consisting of Cs, K, and Na; M2 is at least one selected from the group consisting of Zr, Sn, V, Nb, Ta, Mo, W, Fe, Co, Mn, and Al; $0 \leq w \leq 10$; $0 < x < 2$; $0 < y < 8$; $0 < z < 8$; and $-0.5 \leq \delta \leq 0.5$.

The active material may be a battery active material. If the active material is a battery active material, the active material may be contained in an electrode. In the electrode, the active material may be contained in an active material-containing layer. The active material-containing layer may further contain an electro-conductive agent and a binder. The electrode containing the active material may be included as, for example, a negative electrode in a secondary battery. The secondary battery may be a lithium secondary battery. If the active material is contained in the lithium secondary battery, lithium may be inserted into and extracted from the active material.

The composite oxide included in the active material according to the first embodiment may correspond to the substituted composite oxide of potassium octatitanate represented by the general formula $Li_wK_2Ti_8O_{17+\delta}$, in which, within a monoclinic layered crystal structure of the potassium octatitanate, a part or all of the K sites is substituted by cation M1 and/or K ions are removed from part of the K sites to form vacancies, and in which at least part of the Ti sites is substituted by cation M2.

When the occupancy of the K sites changes in the crystal structure of a composite oxide, the amount of sites for inserting lithium ions changes, and thus the charge-and-discharge capacity changes. In the composite oxide included in the active material according to the first embodiment, which is represented by the general formula $Li_wM1_{2-x}Ti_{8-y}M2_zO_{17+\delta}$ wherein $0 < x < 2$, the portion corresponding to part of the M1 sites becomes vacancies. These vacancies can serve as a further site for the insertion and extraction of lithium ions. As the sites available for the insertion of lithium ions increase, a higher capacity can be achieved. Also, since the charge repulsion is reduced at the sites that may become a host for lithium ions, a higher reversible capacity can be realized.

Moreover, inclusion of an alkali ion as M1 will allow the composite oxide to have an average potential for the lithium insertion within the potential range of 0.5 V (vs. Li/Li$^+$) or higher and 1.45 V (vs. Li/Li$^+$) or lower relative to the redox potential of metallic lithium. As such, secondary batteries that adopt, as a negative electrode, the active material according to the first embodiment can exhibit a higher battery voltage and a higher charge-and-discharge capacity than, for example, a secondary battery that adopts, as a negative electrode, a titanium composite oxide having a lithium insertion potential of 1.55 V (vs. Li/Li$^+$). Furthermore, the composite oxide included in the active material according to the first embodiment can have a monoclinic layered structure. In the layered structure, a layer containing lithium and element M1, and a layer containing Ti and element M2 are alternately arranged. Accordingly, the movement of lithium ions along a plane is facilitated in the layer containing lithium and element M1. Secondary batteries with excellent charge-and-discharge rate performances can thereby be provided.

Consequently, the active material according to the first embodiment can realize secondary batteries exhibiting both a high battery voltage and a high charge-and-discharge capacity, that is, able to exhibit a high energy density, and are excellent in charge-and-discharge rate performances.

In the general formula $Li_wM1_{2-x}Ti_{8-y}M2_zO_{17+\delta}$ representing the composite oxide, the index w may change within $0 \leq w \leq 10$ depending on the state of charge of the composite oxide. For instance, according to the production method which will be described later, there can be produced, for example, a composite oxide wherein the index w is 0 in the above-described general formula. When the composite oxide wherein the index w is 0 is incorporated in a secondary battery as the negative electrode active material, and the secondary battery is charged, a state can be achieved where the value w is increased to a value of more than 0 and 10 or less. Alternatively, for example, according to the method which will be described later, the composite oxide may be synthesized using a raw material composition ratio wherein the value of the index w would be more than 0 and 10 or less before the initial charge. When the active material includes a composite oxide in a state where the lithium amount w is more than 0 and 10 or less before the initial charge, trapping of the lithium ions within the structure of the active material during the initial charge and discharge is suppressed, and as a result, the initial charge-and-discharge efficiency can be improved.

In the general formula $Li_wM1_{2-x}Ti_{8-y}M2_zO_{17+\delta}$ representing the composite oxide, the index $2-x$ indicates the amount of elements M1 in the crystal structure of the composite oxide. With the active material according to the first embodiment, it is possible to adjust the theoretical values of charge-and-discharge capacities of the electrodes containing the active material, by changing the amount of M1 in the crystal structure of the composite oxide, that is, by changing the value of the index 2−x. From another perspective, when a substituted composite oxide of potassium octatitanate ($Li_wK_2Ti_8O_{17+\delta}$) is expressed as the general formula $Li_wK_{2-x}Ti_{8-y}M2_zO_{17+\delta}$, the index x is indicative of a proportion having been substituted by cation M1 or by a vacancy among the sites corresponding to the K site. The index x falls within 0<x<2, preferably 0.1≤x≤0.9, and more preferably 0.25≤x≤0.75.

In this composite oxide, the portion corresponding to at least part of the K site of the composite oxide $Li_wK_{2-x}Ti_{8-y}M2_zO_{17+\delta}$, that is, the portion of the proportion indicated by the index x, are vacancies.

When a K ion is removed from part of the K site in the composite oxide $Li_wK_{2-x}Ti_{8-y}M2_zO_{17+\delta}$ and a vacancy is formed, the total cation valence in the composite oxide decreases. Specifically, assuming that x moles of K ions have been removed from 1 mole of the composite oxide $Li_wK_{2-x}Ti_{8-y}M2_zO_{17+\delta}$ to form vacancies corresponding to x moles, the total cation valence of this composite oxide is decreased by x. At this time, the charge neutrality can be maintained by, for example, inserting lithium ions into the formed vacancies or substituting part of the Ti sites in $Li_wK_{2-x}Ti_{8-y}M2_zO_{17+\delta}$ with either pentavalent cation $M2^{5+}$ or hexavalent cation $M2^{6+}$ as cation M2 so that the valence decrease x is compensated for. Such substitution can reduce the K ions that impair the conduction of lithium ions and can increase the vacancies serving as host sites for lithium ions, while maintaining the crystal structure of the composite oxide $Li_wK_{2-x}Ti_{8-y}M2_zO_{17+\delta}$. Accordingly, composite oxides corresponding to a substituted composite oxide of potassium octatitanate ($Li_wK_2Ti_8O_{17+\delta}$) can be obtained, which are capable of realizing improved charge-and-discharge capacities.

The explanations have been given using a substituted composite oxide ($Li_wK_{2-x}Ti_{8-y}M2_zO_{17+\delta}$) of potassium octatitanate ($Li_wK_2Ti_8O_{17+\delta}$) as a model. However, also in the cases where the element M1 in the composite oxide $Li_wM1_{2-x}Ti_{8-y}M2_zO_{17+\delta}$ is an element M1 other than K, or includes an element M1 other than K, it is likewise true that at least part of the M1 site (portion of the proportion indicated by the index x) forms vacancies. Details concerning the M1 site in the composite oxide $Li_wM1_{2-x}Ti_{8-y}M2_zO_{17+\delta}$ are the same as the above explanations using $Li_wK_{2-x}Ti_{8-y}M2_zO_{17+\delta}$ as a model, and therefore will be omitted.

The index 8−y in the general formula $LiM1_{2-x}Ti_{8-y}M2_zO_{17+\delta}$ indicates the amount of Ti contained in the crystal structure of the composite oxide represented by the formula. In other words, the index y can be understood as indicating the site not containing Ti atoms among the Ti sites. The element M2 may be a substitute for the Ti atom in a part of the Ti sites in the composite oxide $Li_wM1_{2-x}Ti_{8-y}M2_zO_{17+\delta}$. As such, in the substituted composite oxide, the combination of indices y and z is indicative of a proportion of the portion among the site corresponding to the Ti sites in the composite oxide $Li_wM1_{2-x}Ti_{8-y}M2_zO_{17+\delta}$ where Ti atoms have been substituted with the cation M2. Meanwhile, among the Ti sites not containing Ti atoms, part of the portion not substituted with the element M2 may include a vacancy. Therefore, the index z takes a value equal to or less than the index y.

The index y falls within 0<y<8, and preferably 0.1≤y≤2.

The index z falls within 0<z<8, preferably 0.1≤z≤2, and more preferably 0.25≤z≤0.75.

The index δ in the general formula $Li_wM1_{2-x}Ti_{8-y}M2_zO_{17+\delta}$ indicates the deficiency of oxygen in the composite oxide represented by this formula, or the amount of oxygen inevitably mixed during the manufacture process of the active material. If the value of the index δ falls within −0.5≤δ≤0.5, the redox state in the composite oxide is stable.

The composite included in the active material according to the first embodiment is preferably a composite oxide having a monoclinic crystal structure belonging to the space group C2/m in the X-ray diffraction profile that can be obtained through the powder X-ray diffraction method using Cu-Kα rays for the composite oxide represented by the general formula $Li_wM1_{2-x}Ti_{8-y}M2_zO_{17+\delta}$. It is further preferred that the composite oxide has a nanotube-form or nanowire-form structure whose grain growth has effected along the [010] direction. Regarding composite oxides having such a structure, a plane distance $d_{200}$ corresponding to the (200) plane falls within the range 7.5 Å≤$d_{200}$≤8.5 Å, in the X-ray diffraction profile that can be obtained for these composite oxides by the powder X-ray diffraction method using Cu-Kα rays.

FIG. 1 shows the crystal structure of $K_{1.75}Ti_{7.75}Nb_{0.25}O_{17}$ as one exemplary composite oxide having a symmetry of the space group C2/m.

In the crystal structure shown in FIG. 1, the vertex position 99 of each polyhedron indicates the position of an oxide ion.

Also, in the crystal structure shown in FIG. 1, the region A indicates a layered site including channels where lithium ions can move two-dimensionally within the crystal structure. Lithium ions can be inserted into and extracted from this region A. The region B has a layered structure of oxides centered about Ti or M2 element(s) that serves as a backbone for the crystal structure.

In the X-ray diffraction profile obtained when this exemplary composite oxide is measured by the powder X-ray diffraction using Cu-Kα rays, the plane distance $d_{200}$ corresponding to the (200) plane appears within the range 7.5 Å≤$d_{200}$≤8.5 Å.

In such a composite oxide, crystallites have grown in the [010] direction, which is preferable for the insertion and extraction of lithium ions. Due to this, the active material including this exemplary composite oxide has improved reversibility of lithium ions during charge and discharge. Accordingly, the active material has an increased effective capacity, and thus able to improve charge-and-discharge rate performance of secondary batteries, as well. Therefore, the active material including the composite oxide is preferred.

The active material according to the first embodiment may contain, in an amount of 20 wt % or less, composite oxides of a crystal structure in which a crystal phase having a symmetry other than C2/m is mixed. Also, the active material may contain, in an amount of 90 wt % or less, composite oxides of a crystal structure (Cmcm, Cmca, Cmmm, Fmmm, Immm, Ibam, I4/m, P112/m, A112/m, B112/m, I112/m) similar to the symmetry of C2/m. In such instances as well, the active materials provide the same effects as in the case of containing solely the composite oxide having a symmetric property of the space group C2/m. It is preferable that a part of the composite oxides having such symmetric crystal structures have a plane distance d analogous to 7.5 Å≤$d_{200}$≤8.5 Å, irrespective of the crystal plane indices. This can improve the reversibility of lithium ions during charge and discharge, and accordingly provide an increased effective capacity and an improved charge-and-discharge rate performance of secondary batteries.

The composite included in the active material according to the first embodiment is preferably a composite oxide represented by the general formula $Li_wM1_{2-x}Ti_{8-y}M2_zO_{17+\delta}$, wherein the element M1 includes K or Na. With K or Na contained in the M1 site, the element M1 (K or Na) may serve as a spacer cation and can constitute a lattice volume with which lithium ions are easily extracted and inserted. Also, since K and Na are industrially inexpensive elements, they provide greater cost advantages than Cs.

On the other hand, the composite included in the active material is preferably a composite oxide containing, as the element M2, at least one selected from the group consisting of V, Nb, Ta, and Mo. Containing V, Nb, Ta, or Mo in the M2 site provides an effect of attracting the electron cloud of oxide ions in the crystal structure. With this effect, the correlation between lithium and oxide ions may be relatively weakened. Thereby, the in-solid movement of lithium ions can be facilitated, achieving an excellent charge-and-discharge performance. Also, by substituting Ti with an element of a higher valence, vacancies can be introduced into the M1 or M2 sites. This allows the increase of the crystal sites that serve as a lithium host, improving the charge-and-discharge capacity.

In one preferred aspect, the cation M2 is Nb. In other words, in this preferred aspect, a composite oxide included in the active material according to the first embodiment is represented by the general formula $Li_wM1_{2-x}Ti_{8-y}Nb_zO_{17+\delta}$. Nb is capable of divalent reduction from pentavalent to trivalent. As such, by substituting Nb for at least part of Ti, which is capable of monovalent reduction from tetravalent to trivalent, while forming a vacancy site at the M1 site, the composite oxide can have an increased amount of lithium insertion.

Furthermore, during lithium insertion for Nb, the potential relative to the redox potential of metallic lithium changes continuously in a wide range, from 1.5 V to 1.0 V. Thus, substituting Nb for at least part of Ti enables not only the increased charge-and-discharge capacity, but also charge and discharge curves including the portion where there is greater potential change in association to capacity changes. Composite oxides capable of providing such charge and discharge curves are easy to recognize the correlation between a charge-and-discharge potential and a charge state, and can simplify the management of the state of charge (SOC) of batteries.

In another preferred aspect, the composite oxide is represented by the general formula $Li_wK_{2-x}Ti_{8-y}M2_zO_{17+\delta}$, wherein: M2 is at least one selected from the group consisting of Zr, Sn, V, Nb, Ta, Mo, W, Fe, Co, Mn, and Al; $0 \le w \le 10$; $0 < x < 2$; $0 < y < 8$; $0 < z < 8$; and $-0.5 \le \delta \le 0.5$.

In the monoclinic crystal structure of the composite oxide represented by $Li_wK_{2-x}Ti_{8-y}M2_zO_{17+\delta}$, part of the K site can be reduced to form vacancy sites for serving as hosts for lithium ions. This can increase the energy density per unit weight or unit volume while maintaining the lattice volume that facilitates the insertion and extraction of lithium ions. Also, varying the amount of K can modify the charge-and-discharge capacity of electrodes.

In a further preferred aspect within this aspect, the cation M2 is Nb. That is, in this further preferred aspect, the composite oxide included in the active material according to the first embodiment is represented by the general formula $Li_wK_{2-x}Ti_{8-y}Nb_zO_{17+\delta}$.

In another preferred aspect, the composite oxide included in the active material according to the first embodiment includes two or more elements that differ in valence, within the sites corresponding to the Ti sites in the formula $Li_wM1_{2-x}Ti_{8-y}M2_zO_{17+\delta}$. Such composite oxides are preferred because of improved discharge rate performances. The improvement in discharge rate performance is due to the following mechanism. For example, when two or more elements differing in electronic correlation with an oxide ion are present in the sites corresponding to the Ti sites within the crystal structure of the composite oxide $Li_wM1_{2-x}Ti_{8-y}M2_zO_{17+\delta}$, there are generated multiple sites different in electronic correlations between a lithium ion and an oxide ion. Concretely, the higher-valent element included in the site is apt to attract more of an electron cloud of oxide ions, whereas the lower-valent element is apt to give a weak correlation between an oxide ion and an electron cloud. Such behaviors create different electron conditions of the oxide ions adjacent to the lithium host site, resulting also in the difference in electronic correlations which the lithium ions receive from the lithium host site. Accordingly, the lithium ions will be conducted selectively via routes facilitating insertion and extraction.

The composite oxide included in the active material according to the first embodiment may be in a particulate form, for example. The average particle size of the composite oxide included in the active material of the first embodiment is not particularly limited, and may be changed according to desired battery performance.

It is preferable that the active material according to the first embodiment includes the composite oxide particles described above, and an electro-conductive substance such as carbon covering the surface of the particles. The active material according to such a preferable aspect can exhibit an improved rapid-charge-and-discharge performance. In the composite oxide described above, lithium is inserted and extracted via a homogeneous solid state reaction, and thus the composite oxide has a nature in which the electrical conductivity increases as the lithium insertion amount increases. In such a composite oxide, the electrical conductivity is relatively low in a region where the lithium insertion amount is small. When the surface of the composite oxide particle is covered in advance with a conductive substance such as carbon, accordingly, a high rapid-charge-and-discharge performance can be obtained regardless of the lithium insertion amount.

Alternatively, the same effects as above can be obtained by covering the surface of the composite oxide particles with lithium titanate, which expresses electrical conductivity as lithium becomes inserted, instead of the electro-conductive substance such as carbon. In addition, when the battery is internally short-circuited, lithium is released from the lithium titanate covering the surface of the composite oxide particles, whereupon the lithium titanate becomes insulating, and therefore, excellent safety can be exhibited.

<BET Specific Surface Area>

The BET specific surface area of the composite oxide included in the active material according to the first embodiment is not particularly limited, and is preferably 5 $m^2/g$ or more and less than 200 $m^2/g$. The BET specific surface area is more preferably 5 $m^2/g$ to 30 $m^2/g$.

When the BET specific surface area is 5 $m^2/g$ or more, the contact area between the active material and electrolyte can be secured. Thus, good discharge rate performances can be easily obtained and also, a charge time can be shortened. On the other hand, when the BET specific surface area is less than 200 $m^2/g$, reactivity with between the active material and electrolyte can be prevented from being too high and therefore, the life performance can be improved. When the BET specific surface area is 30 $m^2/g$ or less, side reactions with the electrolyte can be suppressed, and thereby longer life can be further expected. Furthermore, in this case, a coatability of a slurry including the active material used in the production of an electrode, which will be described later, can be improved.

Here, as the measurement of the specific surface area, a method is used where molecules, in which an occupied area in adsorption is known, are adsorbed onto the surface of powder particles at the temperature of liquid nitrogen, and the specific surface area of the sample is determined from the amount of adsorbed molecules. The most often used method is a BET method based on the low temperature/low humidity physical adsorption of an inert gas. This BET method is a method based on the BET theory, which is the most well-known theory of the method of calculating the specific surface area in which the Langmuir theory, which is a monolayer adsorption theory, is extended to multilayer adsorption. The specific surface area determined by the above method is referred to as "BET specific surface area".

<Production Method>

The active materials according to the first embodiment can be synthesized through, for example, the hydrothermal synthesis method described below.

First, 1 M of a hydrochloric solution is mixed into pure water to prepare a solvent at pH=2.0. Next, titanium chloride is dissolved into the solvent to have the mole number that can yield a target composition. Further, metal-chloride or hydroxide materials containing other constituent elements are added in a desired molar ratio. The resultant is subject to sonication using an ultrasonic device at 40 kHz to 120 kHz for 30 minutes to 60 minutes for thorough mixing.

By enhancing the degree of mixing the materials before the hydrothermal synthesis in this manner, nucleation during the hydrothermal synthesis can be made uniform. This will enable controlling the (200) plane distances within a preferred range, and also make it easy to obtain crystal grains having grown along the [010] direction.

Thereafter, the mixture is introduced into a hydrothermal synthesis device equipped with an inner cylinder of Teflon (registered trademark), and heated at 180° C. to 250° C. for 24 hours to 120 hours. After the hydrothermal reaction, the solvent and the solid content are separately collected using a freeze dryer. The collected solid content is rinsed with pure water, followed by vacuum drying at 60° C. for 24 hours.

The thus-obtained powder is heated at 200° C. to 400° C. for 1 hour and subject to a dehydration treatment in air. When a vacancy is introduced into the M1 site as in the cases of the composite oxide $Li_wM1_{2-x}Ti_{8-y}Nb_yO_{17+\delta}$ in the embodiment, water molecules are taken into this site during the hydrothermal reaction. By the dehydration treatment, it is possible to remove the water of crystallization included in the lattice and adjust the plane distance $d_{200}$ corresponding to the (200) plane to be within 7.5 Å≤$d_{200}$≤8.5 Å.

Then, an annealing treatment is performed in air at 350° C. to 500° C. for 1 hour to 12 hours. It has been an issue in the composite oxide $Li_wM1_{2-x}Ti_{8-y}M2_yO_{17+\delta}$ of the embodiment that, when two or more elements differing in valence are contained in the site corresponding to the Ti site, merely conducting the hydrothermal synthesis would not readily provide the crystals grown along the [010] direction. This is assumed to be attributable to the substituting elemental species having an effect of suppressing the growth in particular planes. The present inventors have found that the annealing treatment enables the crystal growth along the [010] direction, even for the compositions having the Ti sites substituted. Presumably, the thermal vibration during the annealing treatment promotes the growth in particular planes.

In the case that the composite oxides obtained through the synthesis in the above manner has symmetry that conform with the space group C2/m, a plane distance $d_{200}$ corresponding to the (200) plane may be within 7.5 Å≤$d_{200}$≤8.5 Å, in the X-ray diffraction profile obtained through the powder X-ray diffraction method with Cu-Kα rays.

As a result of the above-described synthesis, as explained above, a composite oxide represented by the above-described general formula wherein the index w is 0 can be produced, for example. By incorporating the composite oxide having the index w of 0 into a secondary battery as a negative electrode active material, and the secondary battery is charged, the lithium amount w in the formula can be increased to a value of more than 0 and 10 or less. Alternatively, a composite oxide wherein the value of w is more than 0 and 10 or less may be synthesized by using a lithium source such as lithium hydroxide as a raw material. Alternatively, a composite oxide wherein the value of w is more than 0 and 10 or less can be obtained by immersing the composite oxide after synthesis in a lithium hydroxide aqueous solution, or the like.

<Method of Measuring Composite Oxide>

Next, a method for obtaining the X-ray diffraction profile of the active material according to the powder X-ray diffraction method, and a method for examining the composition of the titanium-containing composite oxide included in the active material will be described.

When a target active material to be measured is included in an electrode material of a secondary battery, a pretreatment is performed as described below.

First, a state close to the state in which lithium ions are completely extracted from a crystal of the composite oxide phase in the active material is achieved. For example, when the target active material to be measured is included in a negative electrode, the battery is brought into a completely discharged state. For example, a battery can be discharged in a 25° C. environment at 0.1 C current to a rated end voltage, whereby the discharged state of the battery can be achieved. Although a slight amount of residual lithium ions may exist even in the discharged state, this does not significantly affect results of powder X-ray diffraction measurement described below.

Next, the battery is disassembled in a glove box filled with argon, and the electrode is taken out. The taken-out electrode is washed with an appropriate solvent and dried under reduced pressure. For example, ethyl methyl carbonate may be used for washing. After washing and drying, whether or not there are white precipitates such as a lithium salt on the surface is examined.

The washed electrode is processed or treated into a measurement sample as appropriate, depending on the measurement method to be subjected to. For example, in the case of subjecting to the powder X-ray diffraction measurement, the washed electrode is cut into a size having the same area as that of a holder of the powder X-ray diffraction apparatus, and used as a measurement sample.

When necessary, the active material is extracted from the electrode to be used as a measurement sample. For example, in the case of subjecting to a composition analysis, or in the case of measuring the amount of carbon, the active material is taken out from the washed electrode, and the taken-out active material is analyzed, as described later.

<Method for Obtaining X-Ray Diffraction Profile of Composite Oxide According to Powder X-Ray Diffraction>

The crystal structure of the composite oxide included in the active material can be examined by powder X-Ray Diffraction (XRD).

The powder X-ray diffraction measurement of the active material is performed as follows.

First, the target sample is ground until an average particle size reaches about 5 µm. Even if the original average particle size is less than 5 µm, it is preferable that the sample is subjected to a grinding treatment with a mortar, or the like, in order to grind apart aggregates. The average particle size can be obtained by laser diffraction, for example.

The ground sample is filled in a holder part having a depth of 0.5 mm, formed on a glass sample plate. As the glass sample plate, for example, a glass sample plate manufactured by Rigaku Corporation is used. At this time, care should be taken to fill the holder part sufficiently with the sample. Precaution should be taken to avoid cracking and formation of voids caused by insufficient filling of the sample. Then, another glass plate is used to smoothen the surface of the sample by sufficiently pressing the glass plate against the sample. In this case, precaution should be taken to avoid too much or too little a filling amount, so as to prevent any rises and dents in the basic plane of the glass holder.

Next, the glass plate filled with the sample is set in a powder X-ray diffractometer, and a diffraction pattern (XRD pattern; X-Ray Diffraction pattern) is obtained using Cu-Kα rays.

When the target active material to be measured is included in the electrode material of a secondary battery, first, measurement sample is prepared according to the previously described procedure. The obtained measurement sample is affixed directly to the glass holder, and measured.

Upon which, the position of the peak originating from the electrode substrate such as a metal foil is measured in advance. The peaks of other components such as an electro-conductive agent and a binder are also measured in advance. In such a case that the peaks of the substrate and active material overlap with each other, it is desirable that the layer including the active material (e.g., the later-described electrode layer) is separated from the substrate, and subjected to measurement. This is in order to separate the overlapping peaks when quantitatively measuring the peak intensity. For example, the electrode layer can be separated by irradiating the electrode substrate with an ultrasonic wave in a solvent.

In the case where there is high degree of orientation in the sample, there is the possibility of deviation of peak position and variation in an intensity ratio, depending on how the sample is filled. For example, in some cases, there may be observed from the results of the later-described Rietveld analysis, an orientation in which crystal planes had become arranged in a specific direction when packing the sample, depending on the shapes of particles. Alternatively, in some cases, influence due to orientation can be seen from measuring of a measurement sample that had been obtained by taking out from a battery.

Such a sample having high orientation is measured using a capillary (cylindrical glass narrow tube). Specifically, the sample is inserted into the capillary, which is then mounted on a rotary sample table and measured while being rotated. Such a measuring method can provide the result with the influence of orientation reduced.

When an intensity ratio measured by this method is different from an intensity ratio measured using the flat plate holder or glass holder described above, the influence due to the orientation is considerable, such that measurement results of the rotary sample table are adopted.

As an apparatus for powder X-ray diffraction measurement, SmartLab manufactured by Rigaku is used, for example. Measurement is performed under the following condition:
  X-ray source: Cu target
  Output: 45 kV, 200 mA
  soller slit: 5 degrees in both incident light and received light
  step width (2θ): 0.02 deg
  scan speed: 20 deg/min
  semiconductor detector: D/teX Ultra 250
  sample plate holder: flat glass sample plate holder (0.5 mm thick)
  measurement range: $5° \leq 2\theta \leq 90°$ When another apparatus is used, in order to obtain measurement results equivalent to those described above, measurement using a standard Si powder for powder X-ray diffraction is performed, and measurement is conducted with conditions adjusted such that a peak intensity and a peak top position correspond to those obtained using the above apparatus.

Conditions of the above powder X-ray diffraction measurement is set, such that an XRD pattern applicable to Rietveld analysis is obtained. In order to collect data for Rietveld analysis, specifically, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from a crystal structure model which has been previously estimated. The parameters of the crystal structure (lattice constant, atomic coordinate, crystal site occupancy ratio, or the like) can be precisely analyzed by fitting all the calculated values with the measured values. Thereby, the characteristics of the crystal structure of the synthesized compound can be determined.

Furthermore, the occupancy of compositional elements in each of the sites can be determined. A fitting parameter S is used as the scale for estimating the degree of agreement between the measured intensities and the calculated intensities in the Rietveld analysis. Analysis must be performed in a manner such that the S value would be less than 1.8. When determining the occupancies in each of the sites, the standard deviation σj must be taken into consideration. The fitting parameter S and standard deviation σj defined herein are estimated using the formula described in "Funmatsu X sen Kaisetsu no Jissai" ("Reality of Powder X-Ray Analysis", first edition (2002), X-Ray Analysis Investigation Conversazione, The Japan Society for Analytical Chemistry, written and edited by Izumi Nakai and Fujio Izumi (Asakura Publishing Co., Ltd.)).

In a case where an active material as the measured target includes crystals having space groups different from each other, it is possible to quantitate the included amount of the space groups by the Rietveld analysis. Specifically, information of crystal structure for each of the different crystal phases is individually input, and the input information is fitted with an actually measured XRD pattern, to thereby obtain a mass fraction, based on information on intensity of each phase. More specifically, the mass fraction can be obtained by a method described in Chapter 10, Section 5 of "Funmatsu X sen Kaisetsu no Jissai".

In the same manner, it is possible to determine an amount of vacancy in a target titanium-including composite oxide. Specifically, the atom occupancy in the crystal structural model can be refined by Rietveld analysis. From this result, the presence or absence of the formation of vacancies for each of the active materials can be examined. Specifically, in the case that the value of the atom occupancy obtained as a result of refinement is below 100%, the result indicates that the sites which should be occupied are not occupied by the atoms. In other words, the occupancy is 100% when no vacancy is formed in the target site, and the occupancy is less than 100% when a vacancy is formed in the site.

Using the above-described method, information on the crystal structure of the measured active material can be obtained. For example, when the active material according to the first embodiment is measured as described above, the measured active material would be found to include a composite oxide having a monoclinic structure. In addition, the above-described measurement also allows examination of the symmetry of the crystal structure in the measurement sample, such as the space group C2/m. Moreover, from the crystals' orientation parameters, it is possible to examine the degree of growth toward a particular plane index. For example, if the peak intensity of the (001) plane is higher than the peak intensity expected from the crystal structure, it can be construed that there is crystal growth in the [010] direction.

<Method for Examining Composition of Composite Oxide>

The composition of the composite oxide in the active material can be analyzed using Inductively Coupled Plasma (ICP) emission spectrometry, for example. In this case, the abundance ratios of elements depend on the sensitivity of the analyzing device used. Therefore, when the composition of the composite oxide included in an example of the active material according to the first embodiment is analyzed using ICP emission spectrometry, for example, the numerical values may deviate from the previously described element ratios due to errors of the measuring device. However, even if the measurement results deviate as described above within the error range of the analyzing device, the example of the active material according to the first embodiment can sufficiently exhibit the previously described effects.

In order to measure the composition of the active material assembled into a battery according to ICP emission spectrometry, the following procedure is specifically performed.

First, according to the previously described procedure, an electrode including the target active material to be measured is taken out from a secondary battery, and washed. The washed electrode is put in a suitable solvent, and irradiated with an ultrasonic wave. For example, an electrode is put into ethyl methyl carbonate in a glass beaker, and the glass beaker is vibrated in an ultrasonic washing machine, and thereby an electrode layer including the electrode active material can be separated from a current collector.

Next, the separated electrode layer is dried under reduced pressure. The obtained electrode layer is ground in a mortar or the like to provide a powder including the target active material, electro-conductive agent, binder, and the like. By dissolving the powder in an acid, a liquid sample including the active material can be prepared. Here, hydrochloric acid, nitric acid, sulfuric acid, hydrogen fluoride, and the like may be used as the acid. The components in the active material can be found by subjecting the liquid sample to ICP emission spectrometric analysis.

According to the first embodiment, an active material including a composite oxide having a monoclinic crystal structure is provided. This composite oxide is represented by the general formula $Li_wM1_{2-x}Ti_{8-y}M2_zO_{17+\delta}$. The composite oxide can have a crystal structure from and into which the extraction and insertion of lithium ions is facilitated in the potential range of 1.0 V (vs. Li/Li$^+$) or higher and 1.45 V (vs. Li/Li$^+$) or lower. Accordingly, the composite oxide can realize a high reversible capacity during charge and discharge, as well as excellent charge-and-discharge rate performance. The active material according to the first embodiment can therefore, by virtue of exhibiting both a high battery voltage and a high charge-and-discharge capacity, realize secondary batteries with a high energy density that are able to exhibit excellent charge-and-discharge rate performance.

Second Embodiment

According to a second embodiment, there is provided a secondary battery including a negative electrode, a positive electrode, and an electrolyte. As the negative electrode, the secondary battery includes an electrode that includes the active material according to the first embodiment as a battery active material.

The secondary battery according to the second embodiment may further include a separator provided between the positive electrode and the negative electrode. The negative electrode, the positive electrode, and the separator can structure an electrode group. The electrolyte may be held in the electrode group.

The secondary battery according to the second embodiment may further include a container member that houses the electrode group and the electrolyte.

The secondary battery according to the second embodiment may further include a negative electrode terminal electrically connected to the negative electrode and a positive electrode terminal electrically connected to the positive electrode.

The secondary battery according to the second embodiment may be, for example, a lithium secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

1) Negative Electrode

The negative electrode may include a negative electrode current collector and a negative electrode active material-containing layer. The negative electrode active material-containing layer may be formed on one surface or both of reverse surfaces of the negative electrode current collector. The negative electrode active material-containing layer may include a negative electrode active material, and optionally an electro-conductive agent and a binder.

The active material according to the first embodiment may be contained in the negative electrode active material-containing layer as the negative electrode active material. The negative electrode using the active material according to the first embodiment can exhibit a battery voltage higher than conventional oxides of titanium, within a potential range of 1.0 V (vs. Li/Li$^+$) or greater and 1.45 V (vs. Li/Li$^+$) or less. In addition, the active material according to the first embodiment is able to, as described above, exhibit high reversible capacity and excellent charge-and-discharge rate performance in charge and discharge. For this reason, the secondary battery according to the second embodiment including such a negative electrode can exhibit high energy density, high battery voltage, and excellent charge-and-discharge rate performance.

In the negative electrode, the active material according to the first embodiment may be singly used as the negative electrode active material, or two or more kinds of the active material according to the first embodiment may be used. Furthermore, a mixture where one kind or two or more kinds of the active material according to the first embodiment is further mixed with one kind or two or more kinds of another active material may also be used as the negative electrode active material. Examples of other active materials include lithium titanate having a ramsdellite structure (e.g., $Li_2Ti_3O_7$), lithium titanate having a spinel structure (e.g., $Li_4Ti_5O_{12}$), monoclinic titanium dioxide ($TiO_2$), anatase type titanium dioxide, rutile type titanium dioxide, a hollandite type titanium composite oxide, an orthorhombic Na-containing titanium composite oxide (e.g., $Li_2Na_2Ti_6O_{14}$), and a monoclinic niobium titanium composite oxide (e.g., $Nb_2TiO_7$).

The electro-conductive agent is added to improve a current collection performance and to suppress the contact resistance between the negative electrode active material and the current collector. Examples of the electro-conductive agent include carbonaceous substances such as vapor grown carbon fiber (VGCF), acetylene black, carbon black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the negative electrode active material particle.

The binder is added to fill gaps among the dispersed negative electrode active material and also to bind the negative electrode active material with the negative electrode current collector. Examples of the binder include polytetrafluoroethylene (PTFE), polyvinylidene fluoride (PVdF), fluorine rubber, styrene-butadiene rubber, polyacrylate compounds, and imide compounds. One of these may be used as the binder, or two or more may be used in combination as the binder.

The active material, electro-conductive agent and binder in the negative electrode active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the negative electrode active material-containing layer can be improved. When the amount of binder is 2% by mass or more, binding between the negative electrode active material-containing layer and negative electrode current collector is sufficient, and excellent cycling performances can be expected. On the other hand, an amount of each of the electro-conductive agent and binder is preferably 28% by mass or less, in view of increasing the capacity.

As the negative electrode current collector, a material which is electrochemically stable at the lithium insertion and extraction potential (vs. $Li/Li^+$) of the negative electrode active material is used. The negative electrode current collector is preferably made of copper, nickel, stainless steel, aluminum, or an aluminum alloy including one or more elements selected from the group consisting of Mg, Ti, Zn, Mn, Fe, Cu, and Si. The thickness of the negative electrode current collector is preferably from 5 µm to 20 µm. The negative electrode current collector having such a thickness can maintain balance between the strength and weight reduction of the negative electrode.

The density of the negative electrode active material-containing layer (excluding the current collector) is preferably from 1.8 g/cm³ to 2.8 g/cm³. The negative electrode, in which the density of the negative electrode active material-containing layer is within this range, is excellent in energy density and ability to hold the electrolyte. The density of the negative electrode active material-containing layer is more preferably from 2.1 g/cm³ to 2.6 g/cm³.

The negative electrode may be produced by the following method, for example. First, a negative electrode active material, an electro-conductive agent, and a binder are suspended in a solvent to prepare a slurry. The slurry is applied onto one surface or both of reverse surfaces of a negative electrode current collector. Next, the applied slurry is dried to form a layered stack of the negative electrode active material-containing layer and the negative electrode current collector. Then, the layered stack is subjected to pressing. The negative electrode can be produced in this manner. Alternatively, the negative electrode may also be produced by the following method. First, a negative electrode active material, an electro-conductive agent, and a binder are mixed to obtain a mixture. Next, the mixture is formed into pellets. Then the negative electrode can be obtained by arranging the pellets on the negative electrode current collector.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may include one kind of positive electrode active material, or alternatively, include two or more kinds of positive electrode active materials. Examples of the oxide and sulfide include compounds capable of having lithium and lithium ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($LiNi_{1-x-y}Co_xMn_yO_2$; $0<x<1$, $0<y<1$, $x+y<1$). As the active material, one of these compounds may be used singly, or plural compounds may be used in combination.

More preferred examples of the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $LiNi_{1-y}Co_yO_2$; $0<x\leq1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x≤1$, $0<y<1$), lithium iron phosphates (e.g., $Li_xFePO_4$; $0<x≤1$), and lithium nickel cobalt manganese composite oxides ($LiNi_{1-x-y}Co_xMn_yO_2$; $0<x<1$, $0<y<1$, $x+y<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0≤x≤1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 µm. The positive electrode active material having a primary particle size of 100 nm or more is easy to handle during industrial production. In the positive electrode active material having a primary particle size of 1 am or less, diffusion of lithium ions within solid can proceed smoothly.

The specific surface area of the positive electrode active material is preferably from 0.1 $m^2$/g to 10 $m^2$/g. The positive electrode active material having a specific surface area of 0.1 $m^2$/g or more can secure sufficient sites for inserting and extracting lithium ions. The positive electrode active material having a specific surface area of 10 $m^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, and imide compounds. One of these may be used as the binder, or two or more may be used in combination as the binder.

The electro-conductive agent is added to improve a current collection performance and to suppress the contact resistance between the positive electrode active material and the positive electrode current collector. Examples of the electro-conductive agent include carbonaceous substances such as vapor grown carbon fiber (VGCF), acetylene black, carbon black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of a electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode may be produced by the following method, for example. First, a positive electrode active material, an electro-conductive agent, and a binder are suspended in a solvent to prepare a slurry. The slurry is applied onto one surface or both of reverse surfaces of a positive electrode current collector. Next, the applied slurry is dried to form a layered stack of the positive electrode active material-containing layer and the positive electrode current collector. Then, the layered stack is subjected to pressing. The positive electrode can be produced in this manner. Alternatively, the positive electrode may also be produced by the following method. First, a positive electrode active material, an electro-conductive agent, and a binder are mixed to obtain a mixture. Next, the mixture is formed into pellets. Then the positive electrode can be obtained by arranging the pellets on the positive electrode current collector.

3) Electrolyte

As the electrolyte, for example, a liquid nonaqueous electrolyte or gel-like nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel-like nonaqueous electrolyte is prepared by obtaining a composite of a liquid nonaqueous electrolyte and a polymeric material. Examples of the polymeric material include polyvinylidene fluoride (PvdF), polyacrylonitrile (PAN), polyethylene oxide (PEO), and mixtures thereof.

Alternatively, other than the liquid nonaqueous electrolyte and gel-like nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in nonaqueous electrolyte batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having lithium ion conductivity.

4) Separator

The separator may be made of, for example, a porous film or synthetic resin nonwoven fabric including polyethylene, polypropylene, cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 1% by mass or less.

The shape of the container member is not particularly limited. The shape of the container member may be, for example, flat (thin), square, cylinder, coin, or button-shaped. Depending on battery size, the container member may be, for example, a container member for compact batteries installed in mobile electronic devices, or container member for large batteries installed on vehicles such as two-wheeled to four-wheeled automobiles, railway cars, and the like.

6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

7) Positive Electrode Terminal

The positive electrode terminal may be made of, for example, a material that is electrically stable in the potential range of 3 V to 5 V (vs. Li/Li$^{+)}$ relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, Si, and the like. The positive electrode terminal is preferably made of the same material as the positive electrode current collector, in order to reduce contact resistance with the positive electrode current collector.

Next, the secondary battery according to the second embodiment will be more specifically described with reference to the drawings.

Figure 2:
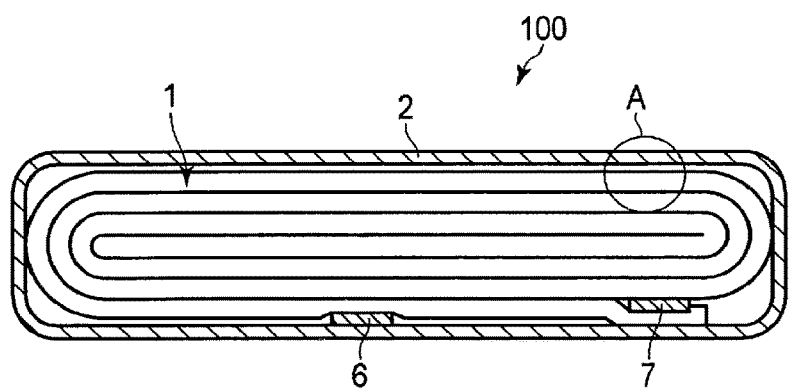
FIG. 2 is a cross-sectional view schematically showing an example of a secondary battery according to an embodiment.
Figure 3:
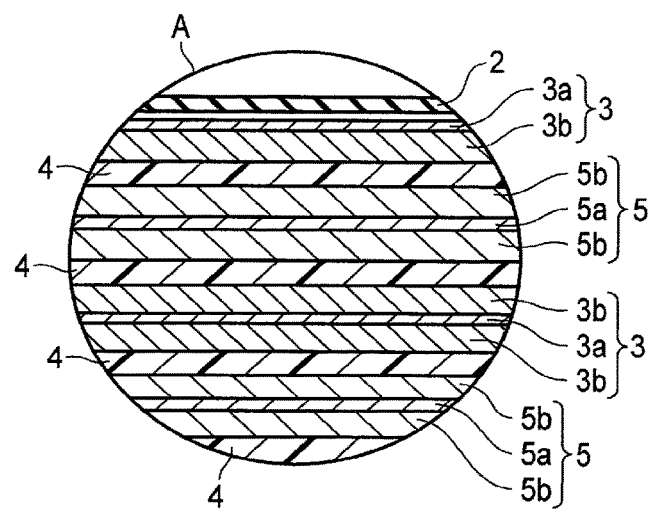
FIG. 3 is an enlarged cross-sectional view of section A of the secondary battery shown in FIG. 2.

FIG. 2 is a cross-sectional view schematically showing an example of a secondary battery according to the second embodiment. FIG. 3 is an enlarged cross-sectional view of section A of the secondary battery shown in FIG. 2.

The secondary battery 100 shown in FIGS. 2 and 3 includes a bag-shaped container member 2 shown in FIG. 2, an electrode group 1 shown in FIGS. 2 and 3, and an electrolyte, which is not shown. The electrode group 1 and the electrolyte are housed in the container member 2. The electrolyte (not shown) is held in the electrode group 1.

The bag-shaped container member 2 is made of a laminate film including two resin layers and a metal layer sandwiched between the resin layers.

As shown in FIG. 2, the electrode group 1 is a wound electrode group in a flat form. The wound electrode group 1 in a flat form includes a negative electrode 3, a separator 4, and a positive electrode 5, as shown in FIG. 3. The separator 4 is sandwiched between the negative electrode 3 and the positive electrode 5.

The negative electrode 3 includes a negative electrode current collector 3a and a negative electrode active material-containing layer 3b. The active material according to the first embodiment is included in the negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 3. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 2, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

Figure 4:
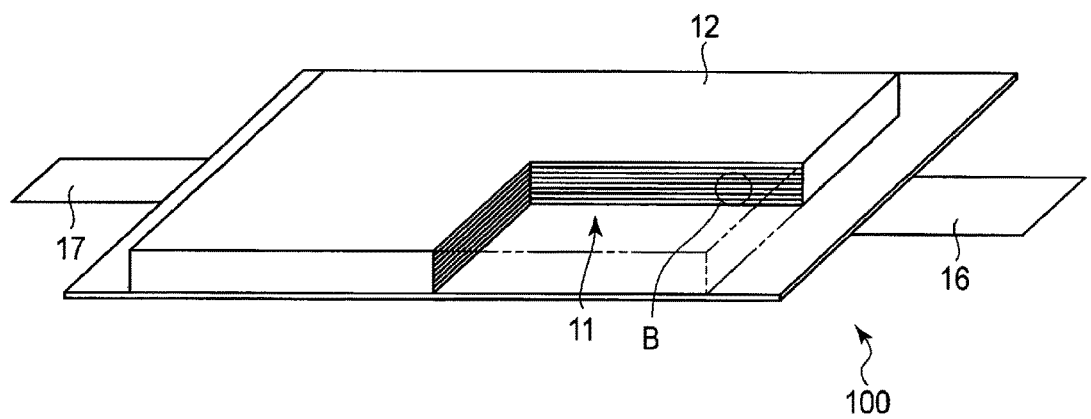
FIG. 4 is a partially cut-out perspective view schematically showing another example of the secondary battery according to the embodiment.
Figure 5:
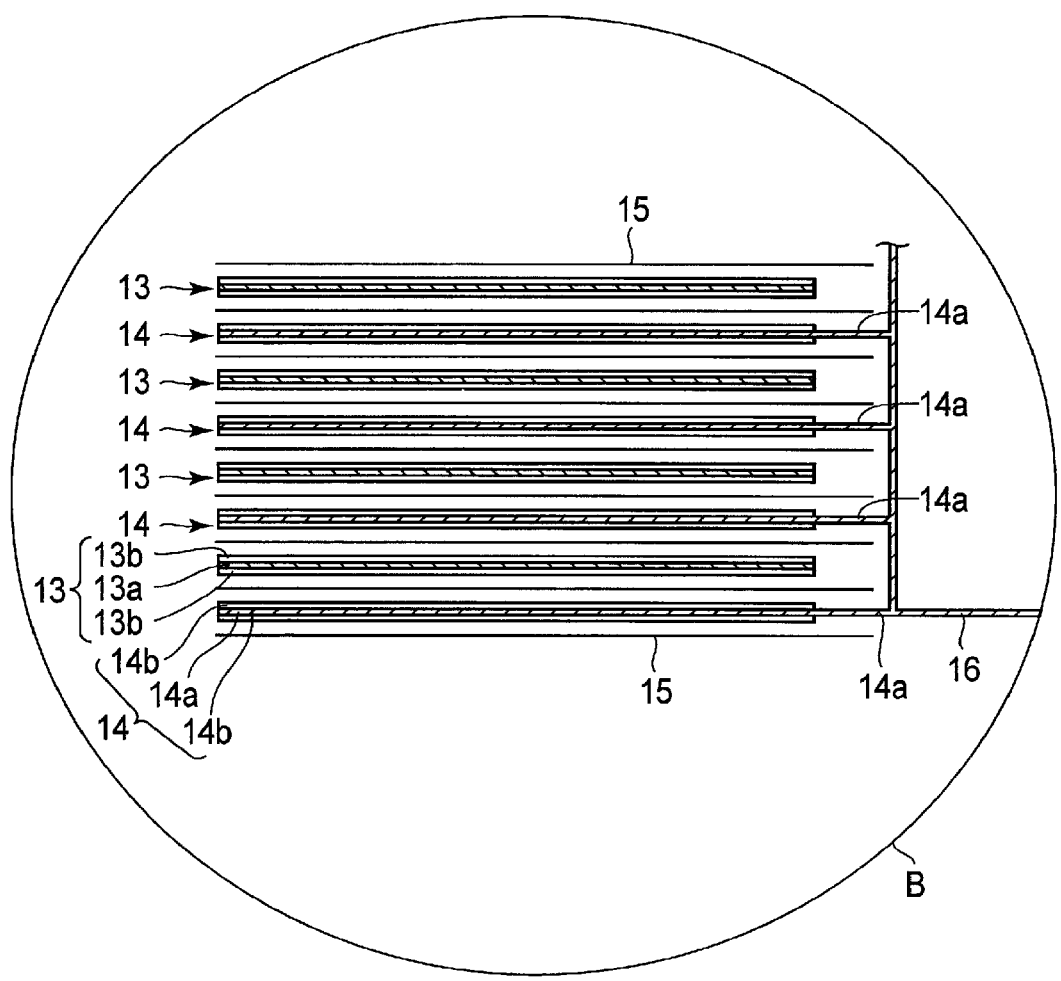
FIG. 5 is an enlarged cross-sectional view of section B of the secondary battery shown in FIG. 4.

The secondary battery according to the second embodiment is not limited to the secondary battery of the structure shown in FIGS. 2 and 3, and may be, for example, a battery of a structure as shown in FIGS. 4 and 5.

FIG. 4 is a partially cut-out perspective view schematically showing another example of a secondary battery according to the second embodiment. FIG. 5 is an enlarged cross-sectional view of section B of the secondary battery shown in FIG. 4.

The secondary battery 100 shown in FIGS. 4 and 5 includes an electrode group 11 shown in FIGS. 4 and 5, a container member 12 shown in FIG. 4, and an electrolyte, which is not shown. The electrode group 11 and the electrolyte are housed in the container member 12. The electrolyte is held in the electrode group 11.

The container member 12 is made of a laminate film including two resin layers and a metal layer sandwiched between the resin layers.

As shown in FIG. 5, the electrode group 11 is a stacked electrode group. The stacked electrode group 11 has a structure in which positive electrodes 13 and negative electrodes 14 are alternately stacked with separator(s) 15 sandwiched therebetween.

The electrode group 11 includes plural positive electrodes 13. Each of the plural positive electrodes 13 includes a positive electrode current collector 13a, and positive electrode active material-containing layers 13b supported on both of reverse surfaces of the positive electrode current collector 13a. The electrode group 11 includes plural negative electrodes 14. Each of the plural negative electrodes 14 includes a negative electrode current collector 14a, and negative electrode active material-containing layers 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of each positive electrode current collector 13a of the positive electrodes 13, which is positioned on the side opposite to the protruded end of the negative electrode current collector 14a, protrude out from the positive electrode 13. The positive electrode current collector 13a protruding out from the positive electrode 13 is electrically connected to a strip-shaped positive electrode terminal 17. The tip of the strip-shaped positive electrode terminal 17 is positioned on the opposite side from the negative electrode terminal 16, and extended out from the container member 12.

The secondary battery according to the second embodiment includes the active material according to the first embodiment. Thus, the secondary battery according to the second embodiment can exhibit a high energy density, a high battery voltage, and excellent charge-and-discharge rate performance.

Third Embodiment

According to a third embodiment, a battery module is provided. The battery module according to the third embodiment includes plural secondary batteries according to the second embodiment.

In the battery module according to the third embodiment, each of the single batteries may be arranged electrically connected in series, in parallel, or in a combination of in-series connection and in-parallel connection.

An example of the battery module according to the third embodiment will be described next with reference to the drawings.

FIG. 6 is a perspective view schematically showing an example of the battery module according to the third embodiment. A battery module 200 shown in FIG. 6 includes five single-batteries 100, four bus bars 21, a positive electrode-side lead 22, and a negative electrode-side lead 23. Each of the five single-batteries 100 is a secondary battery according to the second embodiment.

Each bus bar 21 connects a negative electrode terminal 6 of one single-battery 100 and a positive electrode terminal 7 of the single-battery 100 positioned adjacent. The five single-batteries 100 are thus connected in series by the four bus bars 21. That is, the battery module 200 shown in FIG. 6 is a battery module of five in-series connection.

As shown in FIG. 6, the positive electrode terminal 7 of the single-battery 100 located at one end on the left among the row of the five single-batteries 100 is connected to the positive electrode-side lead 22 for external connection. In addition, the negative electrode terminal 6 of the single-battery 100 located at the other end on the right among the row of the five single-batteries 100 is connected to the negative electrode-side lead 23 for external connection.

The battery module according to the third embodiment includes the secondary battery according to the second embodiment. Hence, the battery module can exhibit a high energy density, a high battery voltage, and excellent charge-and-discharge rate performance.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 7:
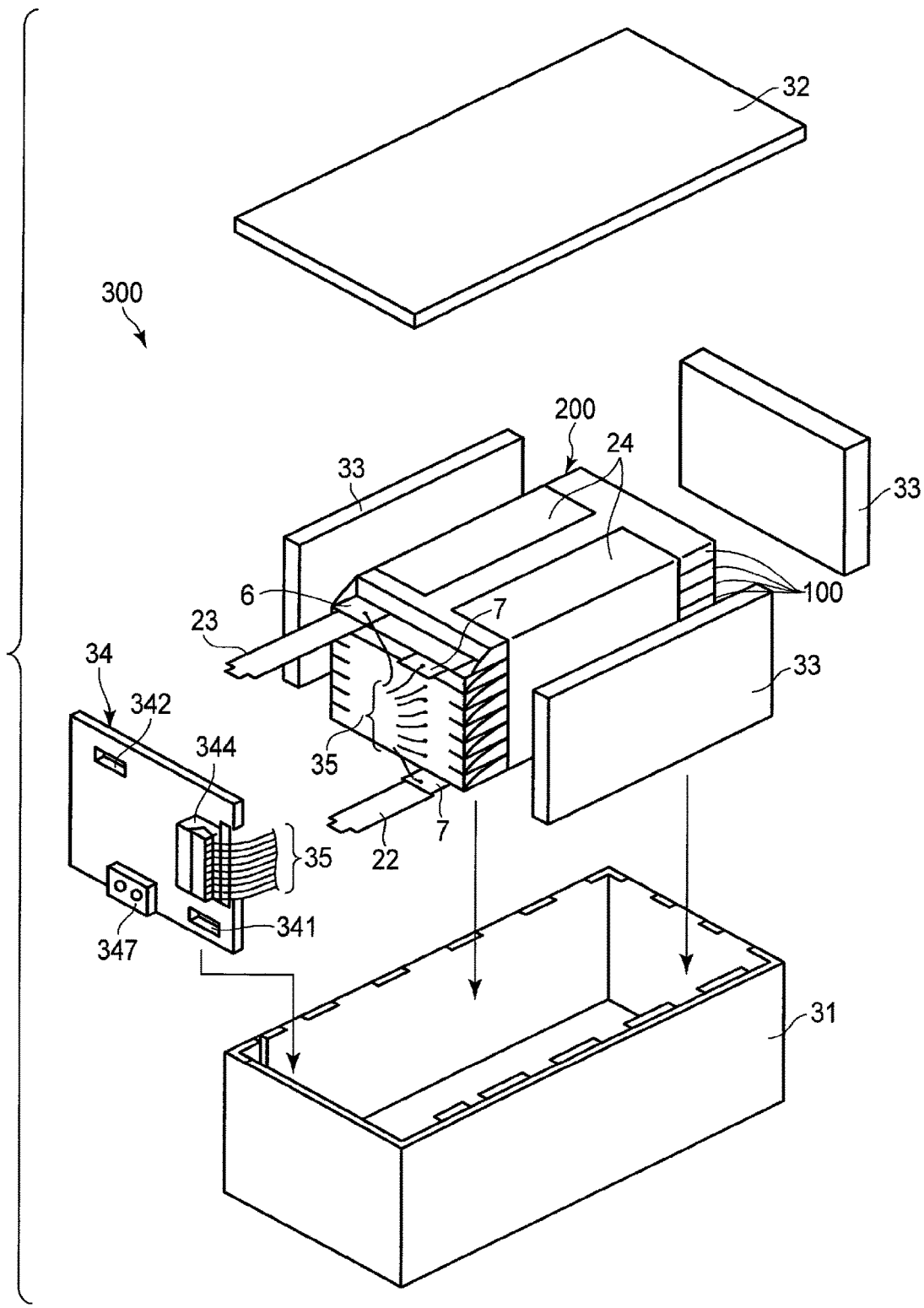
FIG. 7 is an exploded perspective view schematically showing an example of a battery pack according to an embodiment.

FIG. 7 is an exploded perspective view schematically showing an example of the battery pack according to the fourth embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

The housing container 31 is configured to house the protective sheets 33, the battery module 200, the printed wiring board 34, and the wires 35. The lid 32 covers the housing container 31 to house the battery module 200 and the like. Although not shown, opening(s) or connection terminal(s) for connecting to external device(s) and the like are provided on the housing container 31 and lid 32.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The battery module 200 includes plural single-batteries 100, a positive electrode-side lead 22, a negative electrode-side lead 23, and an adhesive tape 24. The battery module 200 may alternatively include only one single-battery 100.

A single-battery 100 has a structure shown in FIGS. 2 and 3. At least one of the plural single-batteries 100 is a secondary battery according to the second embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 8. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

Such a battery pack 300 is used, for example, in applications where excellent cycle performance is demanded when a large current is extracted. More specifically, the battery pack 300 is used as, for example, a power source for electronic devices, a stationary battery, an onboard battery for vehicles, or a battery for railway cars. An example of the electronic device is a digital camera. The battery pack 300 is particularly favorably used as an onboard battery.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

The battery pack according to the fourth embodiment includes the secondary battery according to the second embodiment or the battery module according to the third embodiment. Hence, the battery pack can exhibit a high energy density, a high battery voltage, and an excellent charge-and-discharge rate performance.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle.

Examples of the vehicle according to the fifth embodiment include two-wheeled to four-wheeled hybrid electric automobiles, two-wheeled to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

An example of the vehicle according to the fifth embodiment is explained below, with reference to the drawings.

FIG. 9 is a cross-sectional view schematically showing an example of a vehicle according to the fifth embodiment.

A vehicle 400, shown in FIG. 9 includes a vehicle body 40 and a battery pack 300 according to the fourth embodiment.

In FIG. 9, the vehicle 400 is a four-wheeled automobile. As the vehicle 400, for example, two-wheeled to four-wheeled hybrid electric automobiles, two-wheeled to four-wheeled electric automobiles, electric assist bicycles, and railway cars may be used.

This vehicle 400 may have plural battery packs 300 installed. In such a case, the battery packs 300 may be connected in series, connected in parallel, or connected in a combination of in-series connection and in-parallel connection.

The battery pack 300 is installed in an engine compartment located at the front of the vehicle body 40. The location of installing the battery pack 300 is not particularly limited. The battery pack 300 may be installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 10, an aspect of operation of the vehicle according to the fifth embodiment is explained.

FIG. 10 is a view schematically showing another example of the vehicle according to the fifth embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 10) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fifth embodiment includes the battery pack according to the fourth embodiment. Hence, since the battery pack can exhibit a high energy density, high battery voltage, and excellent charge-and-discharge rate performance, a high-performance vehicle can be provided.

EXAMPLES

Hereinafter, the above embodiments will be described in more detail by way of examples. The identification of a crystal phase and estimation of a crystal structure of each of the products were performed by a powder X-ray diffraction method using Cu-Kα rays. The composition of a product was analyzed by an ICP method to examine that a target product was obtained.

Synthesis

Example 1

First, a 1 M aqueous hydrochloric acid solution was mixed into pure water to prepare a solvent at pH=2.0. As the starting materials, commercially-available chloride and hydroxide reagents shown in Table 1 below were dissolved in the prepared solvent. The reagents were provided in amounts for yielding the target composition shown in Table 1, namely, in amounts that satisfied the material molar ratio in Table 1, with the total weight being 1 g. Metal-chloride or hydroxide materials containing other constituent elements were further added in a desired molar ratio. The resultant was mixed by sonication with an ultrasonic device at 40 kHz for 30 minutes and then at 120 kHz for 30 minutes, a total of 60 minutes.

The mixture thus obtained was introduced into a hydrothermal synthesis device equipped with an inner cylinder of Teflon (registered trademark), and heated at 180° C. for 48 hours as shown in Table 3. After the hydrothermal reaction, the solvent and the solid content were separately collected using a freeze dryer. The collected solid content was rinsed with pure water, followed by vacuum drying at 60° C. for 24 hours.

The obtained powder sample was labeled as a product of Example 1.

Example 2

The powder of the product of Example 1 was subjected to dehydration treatment by heating at 200° C. for 1 hour in air, and then to annealing treatment at 350° C. for 12 hours in air.

The sample after the annealing was labeled as a product of Example 2.

Examples 3 to 23

Products of Examples 3 to 23 were synthesized in the following manner. Examples 3 to 13 have the respective target compositions shown in Table 1. Examples 14 to 23 have the respective target compositions shown in Table 2.

For Examples 3 to 13, the chloride and hydroxide reagents and the material molar ratios shown in Table 1 were adopted. For Examples 14 to 23, the chloride and hydroxide reagents and the material molar ratios shown in Table 2 were adopted. Except for these, mixtures of the materials and solvent were obtained in the same manner as Example 1.

The obtained mixtures were each introduced into a hydrothermal synthesis device equipped with an inner cylinder of Teflon (registered trademark), and heated at 180° C. to 250° C. for 24 hours to 120 hours as shown in Table 3. After the hydrothermal reaction, the solvent and the solid content were separately collected using a freeze dryer. The collected solid content was rinsed with pure water, followed by vacuum drying at 60° C. for 24 hours.

Next, the obtained powder was subject to the dehydration treatment by heating at 200° C. to 400° C. for 1 hour in air, and then to the annealing treatment at 350° C. to 500° C. for 1 hour to 12 hours in air, as also shown in Table 3. The samples thus obtained were labeled as products of Examples 3 to 23.

Example 24

In Example 24, the sample obtained in Example 2 was subject to a reduction treatment at 500° C. for 1 hour under a reductive atmosphere, with a nitrogen gas containing 3% hydrogen flowing in an electric furnace.

The sample obtained by the reduction treatment was labeled as a product of Example 24.

Comparative Example 1

In Comparative Example 1, compound $K_2Ti_8O_{17}$ was synthesized as a target composition by the method described in Materials Letters 190 (2017) 177-180 (Qinghua Tian, et al. "The lithium storage properties of potassium octatitanate as anode materials for lithium-ion batteries"). Except that a metallic titanium was used as the Ti material (Ti source) as shown in Table 1 and that the mixing by sonication was omitted, the hydrothermal synthesis was conducted under the conditions shown in Table 3 in the same manner as in Example 1 to yield the target composition shown in Table 1. The sample collected through the freeze-dry step was dried and labeled as a product of Comparative Example 1, without the dehydration treatment or the annealing treatment.

Comparative Example 2

In Comparative Example 2, $Li_2Na_{1.75}Ti_{5.75}Nb_{0.25}O_{14}$ was synthesized by the method described in Jpn. Pat. Appln. KOKAI Publication No. 2016-171071. This material synthesis adopted a solid-phase reaction method, not the hydrothermal synthesis method described above.

Table 1 below lists together the target compositions of the synthesis in Examples 1-13 and Comparative Examples 1-2, as well as the materials (sources of the respective elements) and the mixing ratios (molar ratios) of raw materials adopted in the synthesis.

TABLE 1

| | Target composition | Li source/ amount | M1 source/ amount | Ti source/ amount | M2 source/ amount |
|---|---|---|---|---|---|
| Comparative Example 1 | $K_2Ti_8O_{17}$ | — | KOH/2.0 | Ti(Metal)/8.0 | — |
| Comparative Example 2 | $Li_2Na_{1.75}Ti_{5.75}Nb_{0.25}O_{14}$ | $Li_2CO_3$/1.0 | $Na_2CO_3$/0.875 | $TiO_2$/5.75 | $Nb_2O_5$/0.125 |
| Example 1 | $K_{1.9}Ti_{7.9}Nb_{0.1}O_{17}$ | — | KOH/1.9 | $TiCl_4$/7.9 | $NbCl_5$/0.1 |
| Example 2 | $K_{1.9}Ti_{7.9}Nb_{0.1}O_{17}$ | — | KOH/1.9 | $TiCl_4$/7.9 | $NbCl_5$/0.1 |
| Example 3 | $K_{1.75}Ti_{7.75}Nb_{0.25}O_{17}$ | — | KOH/1.75 | $TiCl_4$/7.75 | $NbCl_5$/0.25 |
| Example 4 | $K_{1.5}Ti_{7.5}Nb_{0.5}O_{17}$ | — | KOH/1.5 | $TiCl_4$/7.5 | $NbCl_5$/0.5 |
| Example 5 | $K_{1.25}Ti_{7.25}Nb_{0.75}O_{17}$ | — | KOH/1.25 | $TiCl_4$/7.25 | $NbCl_5$/0.75 |
| Example 6 | $K_1Ti_7Nb_1O_{17}$ | — | KOH/1.0 | $TiCl_4$/7.0 | $NbCl_5$/1.0 |
| Example 7 | $K_{0.75}Ti_{6.75}Nb_{1.25}O_{17}$ | — | KOH/0.75 | $TiCl_4$/6.75 | $NbCl_5$/1.25 |
| Example 8 | $K_{0.5}Ti_{6.5}Nb_{1.5}O_{17}$ | — | KOH/0.5 | $TiCl_4$/6.5 | $NbCl_5$/1.5 |
| Example 9 | $K_{0.25}Ti_{6.25}Nb_{1.75}O_{17}$ | — | KOH/0.25 | $TiCl_4$/6.25 | $NbCl_5$/1.75 |
| Example 10 | $K_{0.1}Ti_{6.1}Nb_{1.9}O_{17}$ | — | KOH/0.1 | $TiCl_4$/6.1 | $NbCl_5$/1.9 |
| Example 11 | $K_{1.0}Ti_3Sn_4Nb_1O_{17}$ | — | KOH/1.0 | $TiCl_4$/3.0 | $NbCl_5$/1.0 $SnCl_4$/4.0 |
| Example 12 | $K_{1.9}Ti_{0.1}Sn_{7.8}Nb_{0.1}O_{17}$ | — | KOH/1.9 | $TiCl_4$/0.1 | $NbCl_5$/0.1 $SnCl_4$/7.8 |
| Example 13 | $K_{1.5}Cs_{0.2}Na_{0.2}Ti_{7.9}Nb_{0.1}O_{17}$ | — | KOH/1.5 CsCl/0.2 NaOH/0.2 | $TiCl_4$/7.9 | $NbCl_5$/0.1 |

Table 2 below lists together the target compositions of the synthesis in Examples 14-24, as well as the materials (sources of the respective elements) and the mixing ratios (molar ratios) of raw materials adopted in the synthesis.

TABLE 2

| | Target composition | Li source/ amount | M1 source/ amount | Ti source/ amount | M2 source/ amount |
|---|---|---|---|---|---|
| Example 14 | $K_{1.5}Ti_{7.4}Zr_{0.1}Nb_{0.5}O_{17}$ | — | KOH/1.5 | $TiCl_4$/7.4 | $NbCl_5$/0.5 $Zr(SO_4)_2·4H_2O$/0.1 |
| Example 15 | $K_{1.5}Ti_{7.5}Nb_{0.4}Ta_{0.1}O_{17}$ | — | KOH/1.5 | $TiCl_4$/7.5 | $NbCl_5$/0.4 $TaCl_5$/0.1 |
| Example 16 | $K_{1.5}Ti_{7.5}Nb_{0.4}V_{0.1}O_{17}$ | — | KOH/1.5 | $TiCl_4$/7.5 | $NbCl_5$/0.4 $NH_4VO_3$/0.1 |
| Example 17 | $K_{1.4}Ti_{7.5}Nb_{0.4}Mo_{0.1}O_{17}$ | — | KOH/1.4 | $TiCl_4$/7.5 | $NbCl_5$/0.4 $MoCl_5$/0.1 |
| Example 18 | $K_{1.4}Ti_{7.5}Nb_{0.4}W_{0.1}O_{17}$ | — | KOH/1.4 | $TiCl_4$/7.5 | $NbCl_5$/0.4 $WCl_6$/0.1 |
| Example 19 | $K_{1.7}Ti_{7.5}Nb_{0.4}Fe_{0.1}O_{17}$ | — | KOH/1.7 | $TiCl_4$/7.5 | $NbCl_5$/0.4 $FeCl_3$/0.1 |
| Example 20 | $K_{1.7}Ti_{7.5}Nb_{0.4}Co_{0.1}O_{17}$ | — | KOH/1.7 | $TiCl_4$/7.5 | $NbCl_5$/0.4 $CoCl_2·6H_2O$/0.1 |
| Example 21 | $K_{1.7}Ti_{7.5}Nb_{0.4}Mn_{0.1}O_{17}$ | — | KOH/1.7 | $TiCl_4$/7.5 | $NbCl_5$/0.4 $MnCl_2·4H_2O$/0.1 |
| Example 22 | $K_{1.7}Ti_{7.5}Nb_{0.4}Al_{0.1}O_{17}$ | — | KOH/1.7 | $TiCl_4$/7.5 | $NbCl_5$/0.4 $Al(OH)_3$/0.1 |
| Example 23 | $Li_{1.5}K_{0.5}Ti_{7.9}Nb_{0.1}O_{17}$ | LiCl/1.5 | KOH/0.5 | $TiCl_4$/7.9 | $NbCl_5$/0.1 |
| Example 24 | $K_{1.9}Ti_{7.9}Nb_{0.1}O_{16.5}$ | — | KOH/1.9 | $TiCl_4$/7.9 | $NbCl_5$/0.1 |

Table 3 below lists together the temperature conditions and the times adopted in the synthesis processes in Examples 1-24 and Comparative Examples 1-2, that is, for the hydrothermal reaction, the dehydration treatment, and the annealing treatment.

(Examination of Product Compositions)

Compositions of the products of Examples 1 to 24 and Comparative Examples 1 and 2 were analyzed by the ICP method described above. The results are shown in Table 4 below.

TABLE 4

| | | $Li_wM1_{2-x}Ti_{8-y}M2_zO_{17+\delta}$ | | | | |
|---|---|---|---|---|---|---|
| | Composition | w | x | y | z | δ |
| Comparative Example 1 | $K_2Ti_8O_{17}$ | 0 | 2 | 0 | 0 | 0 |
| Comparative Example 2 | $Li_2Na_{1.75}Ti_{5.75}Nb_{0.25}O_{14}$ | — | — | — | — | — |
| Example 1 | $K_{1.9}Ti_{7.9}Nb_{0.1}O_{17}$ | 0 | 0.1 | 0.1 | 0.1 | 0 |
| Example 2 | $K_{1.9}Ti_{7.9}Nb_{0.1}O_{17}$ | 0 | 0.1 | 0.1 | 0.1 | 0 |
| Example 3 | $K_{1.75}Ti_{7.75}Nb_{0.25}O_{17}$ | 0 | 0.25 | 0.25 | 0.25 | 0 |
| Example 4 | $K_{1.5}Ti_{7.5}Nb_{0.5}O_{17}$ | 0 | 0.5 | 0.5 | 0.5 | 0 |
| Example 5 | $K_{1.25}Ti_{7.25}Nb_{0.75}O_{17}$ | 0 | 0.75 | 0.75 | 0.75 | 0 |
| Example 6 | $K_1Ti_7Nb_1O_{17}$ | 0 | 1.0 | 1.0 | 1.0 | 0 |
| Example 7 | $K_{0.75}Ti_{6.75}Nb_{1.25}O_{17}$ | 0 | 1.25 | 1.25 | 1.25 | 0 |
| Example 8 | $K_{0.5}Ti_{6.5}Nb_{1.5}O_{17}$ | 0 | 1.5 | 1.5 | 1.5 | 0 |
| Example 9 | $K_{0.25}Ti_{6.25}Nb_{1.75}O_{17}$ | 0 | 1.75 | 1.75 | 1.75 | 0 |
| Example 10 | $K_{0.1}Ti_{6.1}Nb_{1.9}O_{17}$ | 0 | 1.9 | 1.9 | 1.9 | 0 |
| Example 11 | $K_{1.0}Ti_3Sn_4Nb_1O_{17}$ | 0 | 1.0 | 5.0 | 5.0 | 0 |
| Example 12 | $K_{1.9}Ti_{0.1}Sn_{7.8}Nb_{0.1}O_{17}$ | 0 | 0.1 | 7.9 | 7.9 | 0 |
| Example 13 | $K_{1.5}Cs_{0.2}Na_{0.2}Ti_{7.9}Nb_{0.1}O_{17}$ | 0 | 0.1 | 0.1 | 0.1 | 0 |
| Example 14 | $K_{1.5}Ti_{7.4}Zr_{0.1}Nb_{0.5}O_{17}$ | 0 | 0.5 | 0.6 | 0.6 | 0 |
| Example 15 | $K_{1.5}Ti_{7.5}Nb_{0.4}Ta_{0.1}O_{17}$ | 0 | 0.5 | 0.5 | 0.5 | 0 |
| Example 16 | $K_{1.5}Ti_{7.5}Nb_{0.4}V_{0.1}O_{17}$ | 0 | 0.5 | 0.5 | 0.5 | 0 |
| Example 17 | $K_{1.4}Ti_{7.5}Nb_{0.4}Mo_{0.1}O_{17}$ | 0 | 0.6 | 0.5 | 0.5 | 0 |
| Example 18 | $K_{1.4}Ti_{7.5}Nb_{0.4}W_{0.1}O_{17}$ | 0 | 0.6 | 0.5 | 0.5 | 0 |
| Example 19 | $K_{1.7}Ti_{7.5}Nb_{0.4}Fe_{0.1}O_{17}$ | 0 | 0.3 | 0.5 | 0.5 | 0 |
| Example 20 | $K_{1.7}Ti_{7.5}Nb_{0.4}Co_{0.1}O_{17}$ | 0 | 0.3 | 0.5 | 0.5 | 0 |
| Example 21 | $K_{1.7}Ti_{7.5}Nb_{0.4}Mn_{0.1}O_{17}$ | 0 | 0.3 | 0.5 | 0.5 | 0 |
| Example 22 | $K_{1.7}Ti_{7.5}Nb_{0.4}Al_{0.1}O_{17}$ | 0 | 0.3 | 0.5 | 0.5 | 0 |
| Example 23 | $Li_{1.5}K_{0.5}Ti_{7.9}Nb_{0.1}O_{17}$ | 1.5 | 1.5 | 0.1 | 0.1 | 0 |
| Example 24 | $K_{1.9}Ti_{7.9}Nb_{0.1}O_{16.5}$ | 0 | 0.1 | 0.1 | 0.1 | −0.5 |

TABLE 3

| | Hydrothermal synthesis conditions | Dehydration treatment conditions | Annealing treatment conditions |
|---|---|---|---|
| Comparative Example 1 | 180° C., 24 H | — | — |
| Comparative Example 2 | — | — | — |
| Example 1 | 180° C., 48 H | — | — |
| Example 2 | 200° C., 36 H | 200° C., 1 H | 350° C., 12 H |
| Example 3 | 200° C., 36 H | 200° C., 1 H | 350° C., 12 H |
| Example 4 | 200° C., 36 H | 300° C., 1 H | 350° C., 12 H |
| Example 5 | 200° C., 36 H | 300° C., 1 H | 350° C., 12 H |
| Example 6 | 200° C., 36 H | 400° C., 1 H | 350° C., 12 H |
| Example 7 | 200° C., 36 H | 400° C., 1 H | 350° C., 12 H |
| Example 8 | 200° C., 36 H | 400° C., 1 H | 350° C., 12 H |
| Example 9 | 200° C., 36 H | 400° C., 1 H | 350° C., 12 H |
| Example 10 | 200° C., 36 H | 400° C., 1 H | 350° C., 12 H |
| Example 11 | 200° C., 36 H | 400° C., 1 H | 350° C., 12 H |
| Example 12 | 200° C., 36 H | 200° C., 1 H | 350° C., 12 H |
| Example 13 | 200° C., 36 H | 300° C., 1 H | 350° C., 12 H |
| Example 14 | 180° C., 48 H | 300° C., 1 H | 350° C., 12 H |
| Example 15 | 180° C., 48 H | 300° C., 1 H | 500° C., 6 H |
| Example 16 | 210° C., 30 H | 300° C., 1 H | 500° C., 6 H |
| Example 17 | 210° C., 30 H | 300° C., 1 H | 500° C., 6 H |
| Example 18 | 210° C., 30 H | 300° C., 1 H | 500° C., 6 H |
| Example 19 | 250° C., 24 H | 300° C., 1 H | 500° C., 6 H |
| Example 20 | 250° C., 24 H | 300° C., 1 H | 500° C., 6 H |
| Example 21 | 250° C., 24 H | 300° C., 1 H | 500° C., 6 H |
| Example 22 | 250° C., 24 H | 300° C., 1 H | 500° C., 6 H |
| Example 23 | 180° C., 120 H | 300° C., 1 H | 350° C., 3 H |
| Example 24 | 200° C., 36 H | 200° C., 1 H | 350° C., 12 H |

As shown in Table 4, Examples 1 to 24 and Comparative Examples 1 and 2 were all successful in giving the composite oxide of the target composition.

Note that the product of Example 24, as shown in Table 4, had a value of 16.5 as the index (17+δ) to the oxygen in the composition. That is, the product of Example 24 involved a slight oxygen deficiency as compared to Example 2.

(Powder X-Ray Diffraction Measurement)

Powder X-ray diffraction measurement was performed in the previously-described manner for the products of Examples 1 to 24 and Comparative Examples 1 and 2.

Using the 2θ value of the peak belonging to the (200) plane, which was obtained from the results of the powder X-ray diffraction measurement for each product, lattice plane distances $d_{200}$ were calculated. The results of the calculation are given in Table 5 below.

As seen from Table 5, Comparative Example 1 was found to have a $d_{200}$ of 7.8 Å. On the other hand, Example 1 without the dehydration treatment after the hydrothermal synthesis was found to have a wide $d_{200}$ of 8.63 Å. Example 2 with the dehydration treatment gave a $d_{200}$ of 7.93 Å. This suggests that crystalline water had been introduced into the vacancy formed in the M1 site of the composition represented by $Li_wM1_{2-x}Ti_{8-y}M2_zO_{17+\delta}$ during hydrothermal synthesis, and a proper plane distance can be obtained by the dehydration treatment.

The results of analyzing the results of the above powder X-ray diffractometry by the Rietveld method revealed that the products obtained in Examples 1 to 24 were monoclinic compounds having a symmetry of the space group C2/m shown in FIG. 1. In order to compare the peak intensities according to the (001) plane orientation, the ratio between the (001) plane peak intensity and the (110) plane peak intensity, $I_{(001)}/I_{(110)}$, in Comparative Example 1 was assumed to be a reference value 1.0 for the crystal growth in the [010] direction. The crystal growth in the [010] direction was estimated for each of the products of Examples 1 to 24 and Comparative Example 2 by comparing their peak intensity ratios $I_{(001)}/I_{(110)}$ to the reference peak intensity ratio of Comparative Example 1. Products having a peak intensity relatively larger than the product of Comparative Example 1 yield a value of 1.0 or larger. On the other hand, products with a relative peak intensity ratio smaller than the product of Comparative Example 1 were determined to have involved no crystal growth in the [010] direction. Additionally, it was confirmed from scanning electron microscope images of the particles that the products including nanowire-form or nanotube-form particles could be obtained when the relative peak intensity ratio was greater than 1.2.

Table 5 below lists together the crystal phase, space group, and degree of crystal growth (lattice plane distance $d_{200}$ and [010] plane growth) for each of the products of Examples 1 to 24 and Comparative Examples 1 and 2.

TABLE 5

| | Crystal phase | Space group | lattice plane distance $d_{200}$ (Å) | [010] plane growth |
|---|---|---|---|---|
| Comparative Example 1 | monoclinic | C2/m | 7.80 | 1.0 |
| Comparative Example 2 | orthorhombic | Fmmm | — | none |
| Example 1 | monoclinic | C2/m | 8.63 | none |
| Example 2 | monoclinic | C2/m | 7.93 | 1.1 |
| Example 3 | monoclinic | C2/m | 7.91 | 1.1 |
| Example 4 | monoclinic | C2/m | 7.88 | 1.3 |
| Example 5 | monoclinic | C2/m | 7.85 | 1.2 |
| Example 6 | monoclinic | C2/m | 7.83 | 1.3 |
| Example 7 | monoclinic | C2/m | 7.80 | 1.3 |
| Example 8 | monoclinic | C2/m | 7.76 | 1.1 |
| Example 9 | monoclinic | C2/m | 7.63 | 1.2 |
| Example 10 | monoclinic | C2/m | 7.51 | 1.2 |
| Example 11 | monoclinic | C2/m | 7.82 | 1.2 |
| Example 12 | monoclinic | C2/m | 7.92 | 1.1 |
| Example 13 | monoclinic | C2/m | 7.91 | 1.3 |
| Example 14 | monoclinic | C2/m | 7.85 | 1.2 |
| Example 15 | monoclinic | C2/m | 7.83 | 1.2 |
| Example 16 | monoclinic | C2/m | 7.84 | 1.2 |
| Example 17 | monoclinic | C2/m | 7.84 | 1.2 |
| Example 18 | monoclinic | C2/m | 7.83 | 1.2 |
| Example 19 | monoclinic | C2/m | 7.82 | 1.2 |
| Example 20 | monoclinic | C2/m | 7.83 | 1.2 |
| Example 21 | monoclinic | C2/m | 7.84 | 1.2 |
| Example 22 | monoclinic | C2/m | 7.82 | 1.2 |
| Example 23 | monoclinic | C2/m | 7.81 | 1.3 |
| Example 24 | monoclinic | C2/m | 7.88 | 1.1 |

(Electrochemical Measurement)

Electrochemical measurement was performed in the following manner for each of the products obtained in the above examples and comparative examples. The electrochemical measurement for the product of Example 2 will be described as an example, but the products of the other examples and comparative examples were measured in the same manner as the product of Example 2.

First, particles of the product of Example 2 were ground to an average particle diameter of 5 μm or smaller to obtain a ground product. Next, acetylene black as an electro-conductive agent was added in the proportion of 10 parts by mass with respect to the ground product to obtain a mixture. Then, the mixture was dispersed in N-methylpyrrolidone (NMP) to obtain a dispersion liquid. Into this dispersion liquid, polyvinylidene fluoride (PVdF) as a binder was added in the proportion of 10 parts by mass with respect to the product of the example to prepare an electrode slurry. The slurry was applied onto an aluminum-foil current collector using a blade. The resultant was dried at 130° C. for 12 hours under vacuum and thereafter press-rolled so that the electrode layer (excluding the current collector) had a density of 2.2 g/cm$^3$.

An electrochemical measurement cell for Example 2 was prepared using this electrode, a metallic-lithium foil as a counter electrode, and a nonaqueous electrolyte. As the nonaqueous electrolyte, a mixed solvent of ethylene carbonate and diethyl carbonate (at the volume ratio of 1:1) was used, in which lithium hexafluorophosphate (LiPF$_6$) is dissolved at a concentration of 1 M.

The electrochemical measurement cell for Example 2 was tested for charge and discharge at room temperature. The charge-and-discharge test was performed with a charge-and-discharge current value of 0.2 C (hourly discharge ratio) in the potential range of 1.0 V to 3.0 V (vs. Li/Li$^+$) relative to the metallic lithium electrode. The first Li insertion amount in this test was adopted as an initial charge capacity, and the first Li extraction amount was adopted as an initial discharge capacity. The value obtained by dividing the initial discharge capacity by the initial charge capacity times 100 (initial discharge capacity/initial charge capacity×100) was adopted as an initial charge-and-discharge efficiency.

Next, the electrochemical measurement cell for Example 2 was again charged and discharged to measure a discharge capacity for the second charge-and-discharge cycle. In the same manner as the initial charge-and-discharge efficiency, the charge-and-discharge efficiency of the second cycle (second cycle discharge capacity/second cycle charge capacity x≤100) was calculated.

Subsequently, the electrochemical measurement cell for Example 2 was further charged and discharged repeatedly for 48 cycles (total of 50 cycles) in order to examine that the product of Example 2 would be capable of stable charge and discharge. 1 cycle consisted of 1 charge and 1 discharge. The charge and discharge were performed at room temperature with a current value of 1 C (hourly discharge ratio) in the potential range of 1.0 V to 3.0 V (vs. Li/Li$^+$) relative to the metallic lithium electrode.

To examine the discharge capacity retention ratio after 50 cycles, the electrochemical measurement cell for Example 2 was again charged and discharged with 0.2 C (hourly discharge ratio), and the capacity retention ratio was calculated regarding the value of the second cycle discharge capacity as 100%.

Also, the electrochemical measurement cell for Example 2 was measured for each of 0.2 C discharge capacity and 10.0 C discharge capacity. The 10.0 C discharge capacity obtained by the measurement was divided by the 0.2 C discharge capacity obtained by the measurement so that the discharge rate (10 C/0.2 C discharge capacity ratio) was calculated as an index of rate performance.

Furthermore, the electrochemical measurement cell was adjusted to a 50% charge state (SOC 50%) and measured for the potential (vs. Li/Li$^+$) in this state.

Table 6 below lists together the discharge capacity at the second charge-and-discharge cycle, the initial charge-and-discharge efficiency, the charge-and-discharge efficiency in the second charge-and-discharge cycle, the 10 C/0.2 C discharge capacity ratio, the capacity retention ratio after 50 charge-and-discharge cycles, and the potential at SOC 50%, for each of the electrochemical measurement cells for Examples 1 to 24 and Comparative Examples 1 and 2.

TABLE 6

|  | 2nd cycle discharge capacity (mAh/g) | Initial discharge efficiency (%) | 2nd cycle discharge efficiency (%) | 10 C/0.2 C discharge capacity ratio (%) | Capacity retention ratio after 50 cycles (%) | Potential at SOC 50% (V vs. Li$^+$/Li) |
|---|---|---|---|---|---|---|
| Comparative Example 1 | 156 | 42.8 | 80.1 | 54.4 | 58.9 | 1.38 |
| Comparative Example 2 | 108 | 86.5 | 93.5 | 70.3 | 77.5 | 1.35 |
| Example 1 | 160 | 56.7 | 82.3 | 58.1 | 59.4 | 1.38 |
| Example 2 | 162 | 72.6 | 98.1 | 65.3 | 78.1 | 1.38 |
| Example 3 | 177 | 73.5 | 98.0 | 69.8 | 80.3 | 1.38 |
| Example 4 | 195 | 74.3 | 98.8 | 72.2 | 83.6 | 1.38 |
| Example 5 | 193 | 74.1 | 98.4 | 71.3 | 81.2 | 1.38 |
| Example 6 | 191 | 73.6 | 97.1 | 70.9 | 79.5 | 1.38 |
| Example 7 | 188 | 72.6 | 96.7 | 71.1 | 78.3 | 1.38 |
| Example 8 | 186 | 71.4 | 96.6 | 70.6 | 77.9 | 1.38 |
| Example 9 | 182 | 71.6 | 96.5 | 71.2 | 77.6 | 1.38 |
| Example 10 | 183 | 71.5 | 94.2 | 70.8 | 77.8 | 1.38 |
| Example 11 | 193 | 70.9 | 93.8 | 72.1 | 78.6 | 1.38 |
| Example 12 | 161 | 59.6 | 93.9 | 70.5 | 78.0 | 1.38 |
| Example 13 | 195 | 77.9 | 98.6 | 75.0 | 82.7 | 1.35 |
| Example 14 | 187 | 74.5 | 97.5 | 74.1 | 81.6 | 1.38 |
| Example 15 | 189 | 74.2 | 98.7 | 72.7 | 83.3 | 1.38 |
| Example 16 | 186 | 74.1 | 97.7 | 72.8 | 82.6 | 1.38 |
| Example 17 | 184 | 75.3 | 97.6 | 73.5 | 79.6 | 1.38 |
| Example 18 | 182 | 74.7 | 97.2 | 73.4 | 80.1 | 1.38 |
| Example 19 | 180 | 74.0 | 96.8 | 75.1 | 79.9 | 1.38 |
| Example 20 | 178 | 73.5 | 96.6 | 74.9 | 80.0 | 1.38 |
| Example 21 | 179 | 72.9 | 95.3 | 74.7 | 80.8 | 1.38 |
| Example 22 | 175 | 71.6 | 93.3 | 73.1 | 78.9 | 1.38 |
| Example 23 | 187 | 87.8 | 99.2 | 72.6 | 81.5 | 1.38 |
| Example 24 | 162 | 72.7 | 98.8 | 73.9 | 80.6 | 1.38 |

As shown in Table 6, the electrochemical measurement cells for Examples 1 to 24 exhibited early-stage discharge capacities (discharge capacities at the second charge-and-discharge cycle) that were about 1.5 times to 1.8 times greater than that of the electrochemical measurement cell for Comparative Example 2.

In all of the electrochemical measurement cells for Examples 1 to 24 and Comparative Examples 1 and 2, the charge-and-discharge efficiency in the second charge-and-discharge cycle was higher than the initial charge-and-discharge efficiency. Example 23 and Comparative Example 2 showed a small difference between the initial charge-and-discharge efficiency and the second cycle charge-and-discharge efficiency, as compared to the other examples and comparative example. This is assumed to be attributable to the compositions of the composite oxides in the products of Example 23 and Comparative Example 2 as shown in Table 4, in which lithium had already been included before charging the electrochemical measurement cells for the lithium insertion. Namely, the trapping of lithium in the crystal structure is considered to have been suppressed during the initial charge and discharge.

Turning to the electrochemical measurements on the products of Examples 1 to 22 and 24 and Comparative Example 1 that did not contain lithium before charging, Examples 1 to 22 and 24 showed a smaller difference between the initial charge-and-discharge efficiency and the second cycle charge-and-discharge efficiency as compared to the difference in charge-and-discharge efficiencies of Comparative Example 1. Specifically, in Comparative Example 1, the second cycle charge-and-discharge efficiency almost doubled from the initial charge-and-discharge efficiency. On the other hand, in Examples 1 to 22 and 24, the second charge-and-discharge efficiencies were about 1.3 times to 1.6 times the initial charge-and-discharge efficiencies.

It is inferred that, in Comparative Example 1, potassium was released from the crystal structure of the composite oxide $K_2Ti_8O_{17}$ during the initial charge and discharge, and lithium was inserted to compensate for the released potassium, resulting in the increased amount of lithium trapped in the crystal structure. Meanwhile, the products of Examples 1 to 22 and 24 had compositions corresponding to a substituted composite oxide in which K sites (M1 sites) were substituted with the element M2, and included vacancies at a part of the sites corresponding to the K sites (M1 sites) in the crystal structure. It is inferred that, in Examples 1 to 22 and 24, these vacancies served as sites for the lithium insertion and extraction, resulting in the smaller amount of trapped lithium and therefore providing higher reversible capacities.

Also as shown in Table 6, the electrochemical measurement cells for Examples 1 to 24 exhibited charge-and-discharge efficiencies and the 10 C/0.2 C discharge capacity ratios (rapid discharge performances) that were higher than those of the electrochemical measurement cell for Comparative Example 1.

The potentials at SOC 50%, measured for the electrochemical measurement cells for Examples 1 to 24 and Comparative Examples 1 and 2, were all 1.45 V or less (vs. Li/Li$^+$) and lower than that for oxides of titanium, such as a spinel-type lithium titanate.

According to the results of the electrochemical measurements, the products of Examples 1 to 24 provided all of the high discharge capacity, the high charge-and-discharge efficiency, and the high discharge rate performance, while exhibiting the potentials (vs. Li/Li$^+$) comparable to the products of Comparative Examples 1 and 2, as set forth above. By contrast, the product of Comparative Example 2 was low in the discharge capacity. The product of Comparative Example 1 was low in the charge-and-discharge efficiency and the discharge rate performance.

Additionally, the products of Examples 2 to 24 having plane distances $d_{200}$ within 7.5 Å≤$d_{200}$≤8.5 Å showed higher charge-and-discharge efficiencies, higher discharge rate performances, and higher capacity retention ratios after 50 charge-and-discharge cycles, as compared to the product of Example 1 having a wider $d_{200}$ value of 8.63 Å as described above.

As shown in Table 4, the product of Example 24 involved a slight oxygen deficiency as compared to the product of Comparative Example 2. As shown in Table 6, the electrochemical measurement cell for Example 24 exhibited performance comparable to the electrochemical measurement cell for Example 2. From this, it can be recognized that even with a deviation of about 0.5 in the value of index δ in the general formula $Li_wM1_{2-x}Ti_{8-y}M2_zO_{17+δ}$, there can be provided effects equivalent to the active materials including the composite oxide without an excess or deficiency in the oxygen amount (δ=0).

FIG. 11 shows the initial charge-and-discharge curves obtained based on the electrochemical measurements of the electrochemical measurement cells for Example 3 and Comparative Example 2. In FIG. 11, the solid curves (discharge curve 50 and charge curve 51) indicate the potential changes of the electrode that contained the monoclinic composite oxide of Example 3. The dashed curves (discharge curve 60 and charge curve 61) indicate the potential changes of the electrode that contained the orthorhombic composite oxide of Comparative Example 2.

As shown in FIG. 11, the electrochemical measurement cell for Comparative Example 2 has a low electrode capacity within the effective potential range for the negative electrode of 1.0 V (vs. Li/Li$^)$ to 2.0 V (vs. Li/Li$^+$).

On the other hand, for the electrochemical measurement cell for Example 3, as indicated by the charge-and-discharge curves (discharge curve 50 and charge curve 51) in FIG. 11, the electrode capacity is higher than that of Comparative Example 2, in the potential range of 1.0 V (vs. Li/Li$^+$) to 2.0 V (vs. Li/Li$^+$). As such, it can be recognized that the product of Example 3 is capable of providing batteries with a high energy density.

Although not illustrated, the initial charge-and-discharge curves of the electrochemical measurement cells for Examples 1 and 2 and 4 to 24 were each confirmed to be indicating, as in the instance of Example 3, a higher electrode capacity in the potential range of 1.0 V to 2.0 V (vs. Li/Li$^+$), as compared to Comparative Examples 1 and 2.

Example 25

In Example 25, a nonaqueous electrolyte battery was produced according to the following procedures.

(Production of Negative Electrode)

First, particles of the product of Example 4 were ground so that the average particle size was 5 μm or less to obtain a ground product. Next, acetylene black, as an electro-conductive agent, was mixed with the ground product in a proportion of 6 parts by mass relative to the ground product to obtain a mixture. Next, the mixture was dispersed in NMP (N-methyl-2-pyrrolidone) to obtain a dispersion. Polyvinylidene fluoride (PVdF), as a binder, was mixed with the dispersion in proportion of 10 parts by mass relative to the product of Example 4 to prepare a negative electrode slurry. This slurry was applied onto a current collector made of aluminum foil using a blade. After the resultant was dried at 130° C. for 12 hours in vacuum, the resultant was press-rolled so that a density of the electrode layer (excluding the current collector) was 2.2 g/cm$^3$ to obtain a negative electrode.

(Production of Positive Electrode)

With a commercially available spinel lithium manganese oxide (LiMn$_2$O$_4$) was mixed 5 parts by weight of acetylene black as an electro-conductive agent to obtain a mixture. Next, the mixture was dispersed in NMP to obtain a dispersion. To the dispersion was mixed PVdF, as a binder, in a proportion of 5 parts by weight relative to the lithium manganese oxide to prepare a positive electrode slurry. To a current collector, made of aluminum foil, was applied the slurry using a blade. After the resultant was dried at 130° C. for 12 hours in vacuum, the resultant was press-rolled so that a density of the electrode layer (excluding the current collector) was 2.1 g/cm$^3$, to obtain a positive electrode.

(Production of Electrode Group)

The positive electrode and the negative electrode produced as described above were stacked with a polyethylene separator sandwiched therebetween to obtain a stack. Next, this stack was wound and pressed to obtain a flat-shaped wound electrode group. A positive electrode terminal and a negative electrode terminal were attached to this electrode group.

(Preparation of Nonaqueous Electrolyte)

As a mixed solvent, a mixed solvent of ethylene carbonate and diethyl carbonate (volume ratio of 1:1) was prepared. Lithium hexafluorophosphate (LiPF$_6$) was dissolved in this solvent in a concentration of 1 M. Thus, a nonaqueous electrolyte was prepared.

(Assembly of Nonaqueous Electrolyte Battery)

Using the electrode group and the nonaqueous electrolyte produced as described above, a nonaqueous electrolyte battery of Example 25 was fabricated.

(Charge-and-Discharge Test)

The nonaqueous electrolyte battery of Example 25 was subjected to a charge-and-discharge test at room temperature. The charge-and-discharge test was performed at a charge-and-discharge current value of 0.2 C (hourly discharge rate) within a voltage range of 1.8 V to 3.1 V in battery voltage.

FIG. 12 shows the charge and discharge curves of the nonaqueous electrolyte battery of Example 25. The horizontal axis indicates the charge-and-discharge capacity per weight of the negative electrode according to Example 4. As apparent from this FIG. 12, for the nonaqueous electrolyte battery of Example 25, the voltage changed smoothly and moderately in the voltage range of 2.3 V to 3.0 V. That is, the use of the product of Example 4 could achieve the nonaqueous electrolyte battery exhibiting smooth and moderate potential change in the voltage range of 2.3 V to 3.0 V and also having a high charge-and-discharge capacity per weight of the active material as compared to a spinel-type lithium titanate (Li$_4$Ti$_5$O$_{12}$: 165 mAh/g).

Connecting five of such nonaqueous electrolyte batteries in series will provide an operating-voltage range of 15.1 V to 11.5 V, i.e., higher as compared to the case of adopting a spinel-type lithium titanate (Li$_4$Ti$_5$O$_{12}$) in negative electrodes. That is, since this nonaqueous electrolyte battery has a high operating-voltage range, the battery can constitute a battery module or a battery pack having a voltage compatible with the 12 V lead batteries for automobiles.

As such, the use of the products of the examples allows for high energy-density batteries having both a high voltage and high capacity.

According to at least one of the embodiments and the examples described above, an active material including a composite oxide is provided. The composite oxide has a monoclinic crystal structure and is represented by the general formula $Li_wM1_{2-x}Ti_{8-y}M2_zO_{17+\delta}$, wherein: M1 is at least one selected from the group consisting of Cs, K, and Na; M2 is at least one selected from the group consisting of Zr, Sn, V, Nb, Ta, Mo, W, Fe, Co, Mn, and Al; $0 \leq w \leq 10$; $0<x<2$; $0<y<8$; $0<z<8$; and $-0.5 \leq \delta \leq 0.5$. The active material is capable of achieving secondary batteries and battery packs with both a high energy density and excellent charge-and-discharge rate performances, as well as realizing vehicles provided with the battery packs.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An active material comprising a composite oxide, the composite oxide having a monoclinic crystal structure and represented by a general formula $Li_wM1_{2-x}Ti_{8-y}M2_zO_{17+\delta}$, wherein:
   M1 is at least one selected from the group consisting of Cs, K, and Na;
   M2 is at least one selected from the group consisting of Zr, Sn, V, Nb, Ta, Mo, W, Fe, Co, Mn, and Al;
   $0 \leq w \leq 10$; $0<x<2$; $0<y<8$; $0<z<8$; and $-0.5 \leq \delta \leq 0.5$.

2. The active material according to claim 1, wherein M1 comprises K or Na, and M2 is at least one selected from the group consisting of V, Nb, Ta, and Mo.

3. The active material according to claim 1, wherein M2 is Nb.

4. The active material according to claim 1, wherein the monoclinic crystal structure belongs to a space group C2/m, and a plane distance $d_{200}$ corresponding to a (200) plane is $7.5 \text{ Å} \leq d_{200} \leq 8.5 \text{ Å}$, in a X-ray diffraction profile according to a powder X-ray diffraction method using Cu-Kα rays.

5. The active material according to claim 4, wherein the composite oxide comprises nanotube-form or nanowire-form particles grown along a [010] direction.

6. The active material according to claim 1, wherein the composite oxide is represented by a general formula $Li_wK_{2-x}Ti_{8-y}Nb_zO_{17+\delta}$.

7. An electrode comprising the active material according to claim 1.

8. The electrode according to claim 7, wherein the electrode comprises an active material-containing layer comprising the active material.

9. The electrode according to claim 8, wherein the active material-containing layer further comprises an electro-conductive agent and a binder.

10. A secondary battery comprising:
    a positive electrode;
    a negative electrode; and
    an electrolyte,
    wherein the negative electrode is the electrode according to claim 7.

11. A battery pack comprising the secondary battery according to claim 10.

12. The battery pack according to claim 11, further comprising:
    an external power distribution terminal; and
    a protective circuit.

13. The battery pack according to claim 11, comprising plural of the secondary battery, the secondary batteries being electrically connected in series, in parallel, or in a combination of in a series and in parallel.

14. A vehicle comprising the battery pack according to claim 11.

15. The vehicle according to claim 14, which comprises a mechanism configured to convert kinetic energy of the vehicle into regenerative energy.

* * * * *